US007072901B2

(12) United States Patent
Teraguchi et al.

(10) Patent No.: US 7,072,901 B2
(45) Date of Patent: Jul. 4, 2006

(54) INDEX GENERATION METHOD, INDEX GENERATION APPARATUS, INDEX ADDITION SYSTEM, AND PROGRAM AND STORAGE MEDIUM THEREOF

(75) Inventors: Masayoshi Teraguchi, Yokohama (JP); Tomio Echigo, Yokohama (JP); Takaaki Murao, Yokohama (JP); Ken Masumitsu, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 10/055,694

(22) Filed: Jan. 23, 2002

(65) Prior Publication Data

US 2002/0184220 A1 Dec. 5, 2002

(30) Foreign Application Priority Data

Mar. 30, 2001 (JP) ........................................ 2001-098409

(51) Int. Cl.
*G06F 17/30* (2006.01)

(52) U.S. Cl. ........................ 707/102; 707/104.1; 386/69
(58) Field of Classification Search ...... 707/100–104.1; 386/69

See application file for complete search history.

(56) References Cited

U.S. PATENT DOCUMENTS

| 5,703,655 | A | * | 12/1997 | Corey et al. ................. 348/468 |
| 5,828,809 | A | * | 10/1998 | Chang et al. .................. 386/69 |
| 5,966,495 | A | * | 10/1999 | Takahashi et al. ............. 386/68 |
| 5,995,095 | A | * | 11/1999 | Ratakonda ................ 715/500.1 |
| 6,728,673 | B1 | * | 4/2004 | Furuyama et al. ........... 704/254 |
| 6,789,088 | B1 | * | 9/2004 | Lee et al. .................... 707/100 |

FOREIGN PATENT DOCUMENTS

| JP | 10112835 | 4/1998 |
| JP | 10150629 | 6/1998 |
| JP | 11331761 | 11/1999 |
| JP | 0175149 | 6/2000 |
| JP | 0236518 | 8/2000 |

OTHER PUBLICATIONS

M. A. Smith et al., "Video Skimming for Quick Browsing based on Audio and Image Characterization", Jun. 30, 1995, pp. 1–22, Carnegie Mellon Univ., School of Computer Science.

S. Satoh et al., "Name–It: Naming and Detecting Faces in Video by the Integration of Image and Natural Language Processing", 1997, Proceedings of IJCAL–97 pp. 1488–1493.

T. Sato et al., "Contents Extraction from News Video by Character Recognition and Association of Multimodal Information", Dec. 1999, Robotics Institute, Carnegie Mellon Univ. vol 40. No. 12 pp 4255–4276.

(Continued)

*Primary Examiner*—Greta Robinson
*Assistant Examiner*—Debbie M. Le
(74) *Attorney, Agent, or Firm*—Eric W. Petraske

(57) ABSTRACT

An index generator that generates an index, which is data description contents, such as video contents, comprises: an index description device, for defining in advance basic index information concerning an index; a video display device for the input, the display or the output of contents to which an index is to be added; a triggering action input device, for accepting a triggering action in the contents that is displayed or output; and an index determination device, for generating index data based on the basic index information, which is defined by the index description device, and triggering action input history information, which is entered by the triggering action input device.

21 Claims, 23 Drawing Sheets

OTHER PUBLICATIONS

A. Amir et al., "CueVideo: Automated video/audio indexing and browsing", 1999, Proc. of SIGIR'99, p. 326.

J. Kuboki, "Method of Making Metadata for TV Production Using General Event List (GEL)", Mar. 24, 1999, ITE Technical Report, vol. 23, No. 28, pp. 1–6.

K. Sumiya et al., "Dynamic Video Production and Delivery from Indexed Live Video Stream", Feb. 2000, vol. 41, No. SIG 1 (TOD 5).

* cited by examiner

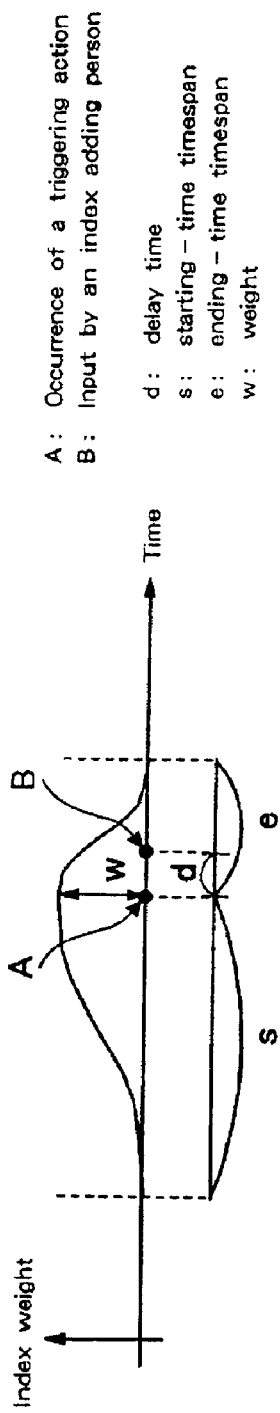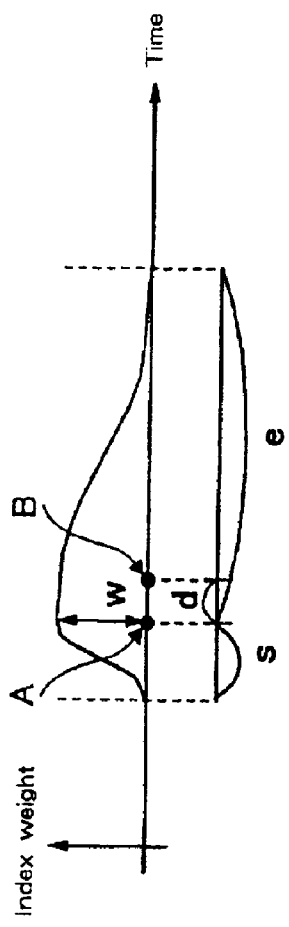
Fig. 4
A: Occurrence of a triggering action
B: Input by an index adding person
d: delay time
s: starting-time timespan
e: ending-time timespan
w: weight
(a) Case wherein video preceding a triggering action is regarded as important
(b) Case wherein video following a triggering action is regarded as important

Fig. 5

Triggering information 71-1

| ID | Name |
|----|------|
| 1 | Pass |
| 2 | ThroughPass |
| 3 | Centering |
| 4 | Shoot |
| 5 | CornerKick |

Multiple triggering index information 73-1

| ID | ReferID | Name | Condition |
|----|---------|------|-----------|
| 1 | 5 | CornerGoal | 6 (<10s) 5 |
| 2 | 4 | ThroughShoot | 2 (<3s) 4 |

Additional information 74-1

| ID | Name |
|----|------|
| 1 | TeamA |
| 2 | TeamB |

Single triggering index information 72-1

| ID | ParentID | Name | Weight | Delay | Start | End | Trigger |
|----|----------|------|--------|-------|-------|-----|---------|
| 1 | – | Pass | 1 | 0 | 2s | 0.5s | 1 |
| 2 | 1 | ThroughPass | 2 | 0 | 2s | 0.5s | 2 |
| 3 | 1 | Centering | 2 | 0 | 2s | 0.5s | 3 |
| 4 | – | Shoot | 3 | 0 | 1s | 0.5s | 4 |
| 5 | 4 | Goal | 4 | 0 | 1s | 0.5s | 5 |
| 6 | – | CornerKick | 2 | 0 | 0.5s | 4s | 6 |

(a) Index addition
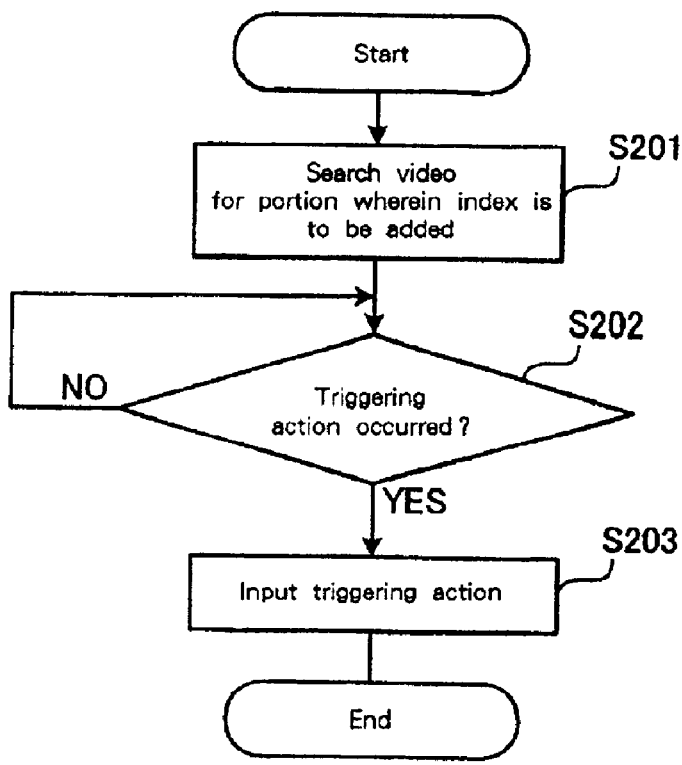
(b) Index deletion
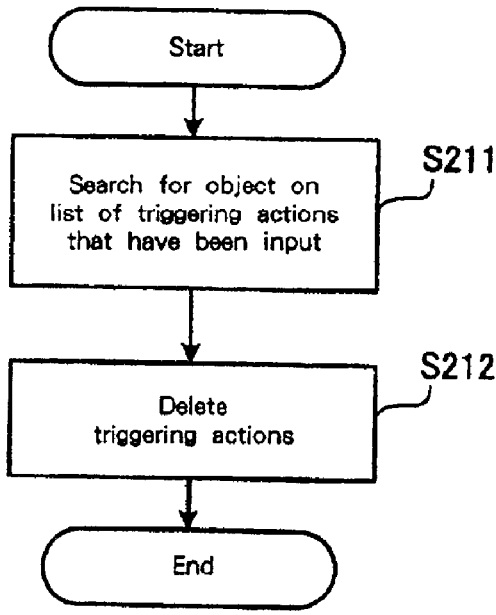
Fig. 18

Fig. 21

Triggering information 71-3

| ID | Name |
|----|------|
| 1 | Strike |
| 2 | Ball |
| 3 | Swing |
| 4 | Foul |
| 5 | Hit |
| 6 | Homerun |

Multiple triggering index information 73-3

| ID | ReferID | Name | Condition |
|----|---------|------|-----------|
| 1 | 4 | MFoul | 3 4 |
| 2 | 6 | MHomerun | 3 6 |

Additional information 74-3

| ID | Name |
|----|------|
| 1 | TeamA |
| 2 | TeamB |

| ID | Name |
|----|------|
| 1 | PlayerM |
| 2 | PlayerT |
| 3 | PlayerH |

Single triggering index information 72-3

| ID | ParentID | Name | Weight | Delay | Start | End | Trigger |
|----|----------|------|--------|-------|-------|-----|---------|
| 1 | – | Strike | 1 | 0 | 2s | 0.5s | 1 |
| 2 | – | Ball | 1 | 0 | 2s | 0.5s | 2 |
| 3 | – | Swing | 1 | 0 | 2s | 0.5s | 3 |
| 4 | 1 | Foul | 2 | 0 | 3s | 1s | 4 |
| 5 | – | Hit | 3 | 0 | 4s | 2s | 5 |
| 6 | 5 | Homerun | 4 | 0 | 4s | 2s | 6 |

INDEX GENERATION METHOD, INDEX GENERATION APPARATUS, INDEX ADDITION SYSTEM, AND PROGRAM AND STORAGE MEDIUM THEREOF

FIELD OF THE INVENTION

The present invention relates to a contents provision technique for providing contents, such as video contents, for a client, and in particular to an index generation apparatus required to efficiently summarize (digest) an enormous amount of contents.

BACKGROUND ART

In order to provide a global and a multimedia communication service, early introduction has been made of a portable telephone that is compatible with the IMT-2000 (International Mobile Telecommunications 2000) specifications, which were prepared for the next-generation mobile communication system. For the IMT-2000 compatible portable telephone, a maximum bandwidth of 2 Mbps is provided, and as one application, a video distribution service is also planned. However, because of various extant conditions, such as the limits imposed by available devices (the sizes and resolutions of the devices) and communication fees, using a portable terminal to watch a video for an extended period of time is difficult.

Therefore, a system for summarizing the enormous amount of video contents involved and for providing a video digest is sorely needed. Specifically, the addition to video of a variety of meaningful information is important, so that videos that satisfy the desires of viewers can be selected and extracted from a huge amount of video stored in a video database, and so that video digests can be generated efficiently. This meaningful information is constituted by indexes (meta data), and an individual who assembles and adds indexes to videos is called an index adding person, while an individual who actually watches and listens to generated digests, which are based on added indexes, is called an index user. A conventional index addition technique is based, for example, on image, speech and natural language processes.

For example, in Japanese Unexamined Patent Publication No. Hei 10-112835, No. 2000-175149 and No. 2000-236518, a technique is disclosed for automatically detecting scenes in video (which constitute continuous video segments that are delimited by unmistakable story line changes effected along the time axis of the video), and for using as indexes representative images for individual scenes and frames, positioned at specific intervals from the head, and linking these indexes to prepare video summaries and to generate digests. However, since according to this technique the summarization of a video is based on the characteristics of the video itself, it is difficult to generate a digest based on any meaning attributable to the contents of the video.

According to a technique disclosed in Japanese Unexamined Patent Publication No. Hei 11-331761, words, such as "tsugi-ni (next)" or "tokorode (by the way)", interjected to effect topical changes are focused on, and video synchronized sub-title information is obtained. To detect topic altering words, obtained information is analyzed, and when one of these words is encountered, it is assumed that there has been a change in the contents of the video and pertinent video is extracted for a specific period of time. This extracted video is used in the construction of indexes, and the indexes that are thus obtained are linked together to prepare a summary of the video. However, to apply this technique, the presence of sub-title information is prerequisite, and the technique can not cope with videos for which such additional information has not been provided.

As a technique that assumes the contents of speech will be dictated, one employs, as indexes, important words encountered in the flow of speech, automatically detected scenes and representative images extracted from individual scenes, information concerning objects depicted in a video, such as portraits or captions, and attendant information, such as a shift in the focus of a camera, that is mainly obtained by the image processing techniques employed (see CMU-CS-95-186, School of Computer Science, Carnegie Mellon University, 1995). Similarly, another proposal has been provided. According to this technique, portraits in a video and the relationship established between portraits correlated with names contained in spoken sentences and the names of persons are employed as indexes, and summaries are prepared based on the individual names (see IJCAI, pp. 1488–1493, 1997). However, this technique also assumes that additional information is present, and thus can not be applied for the common run of video recordings. Another technique involves the identification of a character from a telop in video, and for comparing the character with a character obtained from a closed caption. A character included both in a telop and a closed caption is regarded as a keyword, and the video for the pertinent portion is used as an index. The thus obtained indexes are then linked together to form a video summary (see Transaction of Information Processing Society of Japan, Vol. 40, No. 12-017, 1999). However, according to this technique, it is assumed that closed captions are present, and thus, as for the above technique, video for which no additional information is available can not be coped with.

As a technique for that uses speech recognition, there is one whereby video is summarized by using, as indexes, scenes that are automatically detected using the image processing technique, representative images of these scenes, and information (content, time) concerning the speech that is detected using the speech recognition technique (In Proceedings of SI-GIR '99, p. 326, 1999). This technique can be satisfactorily applied only for limited types of videos, such as news, when there is no background noise or music, and it is difficult to use this technique for other, ordinary types of videos.

Therefore, a technique was developed for adding indexes not only to limited types of videos but also to a wide variety of video types. For example, in Japanese Unexamined Patent Publication No. 2000-23062, telop videos, including telops for the prompt reporting of breaking news and broadly exaggerated telops used for variety programs, that are obtained for video are used as video indexes, and speech, volume values and tone information types are used as speech indexes. Further, personal information is prepared, and based on this information, feature tones are represented using the speech indexes, and corresponding video portions are extracted. When an extracted video portion and telop video are combined and feature video is employed, a digest can be generated for an entire video. However, according to this technique, while speech information is regarded as important, only external information factors are employed, so that it is difficult to generate digests based on the meaning of videos, and videos for which no telops are provided can not be coped with.

An additional technique is disclosed in Japanese Unexamined Patent Publication No. Hei 10-150629. According to this technique, an index adding person sets a "scene", which is a unit wherein a set of contents is expressed, and a "scene group", which consists of a number of scenes, selects an image for each scene and each scene group, and uses the representative images as indexes. According to this technique, the index adding person can use the indexes to generate a video digest corresponding to a situation; however, first, the person must understand the contents of the video and determine which scenes are important.

Therefore, although a digest can be generated based on the meaning of the video contents, an extended period of time is required for the addition of indexes.

When digital broadcasting or video distribution is performed in the future, by contents providers using portable telephones or portable terminals, such as PDAs (Personal Digital Assistants), video distribution services will be established that provide more variety and are more efficient than the conventional services that are presently available. Especially while taking into account the convenience offered by portable terminals when used for video distribution, there will be an increased demand for video digests covering events such as live broadcasts of sports, for which immediacy is requisite. Further, since the time spent actually watching video will be greatly restricted by limitations imposed by the communication fees charged for portable terminals, the demand will be for digests that satisfy the interests and tastes of users and that, appropriately, are short enough for distribution to portable terminals.

As is described above, to efficiently generate digests, indexes must be added to videos. For the distribution of entertainment matter such as movies, dramas or documentaries, for which immediacy of contents is not highly important, indexes can be added to videos using the conventional techniques now employed by broadcast stations. However, when indexes are added to videos for which immediacy is of vital concern, such as live sports broadcasts, the index addition process must be implemented in real time and the reliability of the indexes that are added must be questioned. Conventional techniques will not suffice for the resolution of the problems posed by these two requirements.

PROBLEMS TO BE SOLVED BY THE INVENTION

In order to resolve both problems, real time implementation and the acquisition of reliability, the following technique is disclosed in J. Kuboki, T. Hashimoto and T. Kimura, "Method of Making Metadata for TV Production Using General Event List(GEL)," The Institute of Image Information and Television Engineers Technical Report, Vol. 23, No. 28, PP. 1–6, 1999 (reference 1). First, the events (indexes) that may occur in a video and the attributes of these events are anticipated and described in advance, and while watching live video in real time, an index adding person uses a special terminal to enter only the times (starting points) at which the anticipated events occur. According to this technique, only event starting points are entered; in this case, end points are immaterial. Further, by using multiple terminals several events can be entered at the same time while multiple starting points can be permitted for the input of a single event, while taking into account corrections made for the event. In this example, after events have been input, based on a structured model prepared for a video, a tree structure is prepared that expresses the action taking place in the video by referring to information composed only of starting points, and factors designated in accordance with the tree structure are applied to generate a digest that matches prevailing conditions.

Further, two index addition techniques are disclosed in K. Sumiya, T. Kawaguchi, A. Doi, T. Akasako, K. Tanaka, "Dynamic Video Production and Delivery from Indexed Live Video Stream," Transaction of Information Processing Society of Japan, Vol. 41, No. SIG1 (TOD5), pp. 87–99, 2000 (reference 2). According to the first index addition technique, while watching a video, an index adding person releases the speech like the announcer of a live broadcast, extracts a keyword from the contents of the speech through speech recognition, and defines the keyword as an index. According to the second index addition technique, a special index description tool for each type of video is employed to enter occurrences and to use them for the preparation of indexes. The thus prepared indexes are then sorted into three types: a primary event type, which is determined by a single occurrence; a compound event type, which is a product of multiple primary events; and a situation type. As a feature, only points whereat events occur need be entered, and an index can be prepared that is formed only when multiple events have been established.

However, according to the techniques in reference documents 1 and 2, an index must always be added to each portion of a video, and indexes including unnecessary video events tend to be added. Therefore, the following limitation is imposed in order to generate a shorter digest that matches the interests and the taste of an index user.

First, an effective index time range can not be arbitrarily set. According to the techniques described in reference documents 1 and 2, an index always begins with an event and ends with an event. However, depending on the index, the video sequence immediately preceding a specific event is regarded as being more important, or the video sequence immediately following a specific event may be regarded as being more important, and in such a case can not be coped with by the reference documents 1 and 2. An example wherein a video sequence immediately preceding a specific event is regarded as more important is the index for a soccer game sequence in which a goal is made. The importance of the scene is not apparent until the shot is successful, and the important video sequence is the one leading up to that successful shot. An example wherein the video sequence immediately following a specific event is regarded as more important is the index for the scene of a corner kick in a soccer game. At the time the ball is kicked it is apparent there has been a corner kick; however, the important video sequence is the one immediately following the kicking of the ball.

Second, in reference documents 1 and 2, since the indexes are defined sequentially, as a time series, two or more different indexes can not be independently added to a specific portion of video. Therefore, it is difficult to cope with a case wherein the movements of individual sport players are to be expressed as indexes.

Third, in reference documents 1 and 2, only a digital concept concerning whether or not indexes are present is taken into account. With these indexes, it is difficult to generate short digests that satisfactorily reflect the tastes of index users and that are appropriate for distribution to portable terminals.

SUMMARY OF THE INVENTION

To resolve the above technical shortcomings, it is one object of the present invention to add indexes in real time, even to videos for which immediacy is requisite.

It is another object of the present invention to add indexes that permit the generation of shorter digests that reflect the tastes of users.

To achieve the above objects, according to the present invention, an index generation method comprises the steps of: defining, in advance, basic index information concerning an index that constitutes data that describes contents; and generating the index by employing operating procedures that use the basic index information, wherein information relative to a triggering action for the generation of an index and information concerning a timespan for the index are defined for the basic index information.

The information concerning the timespan, which is defined as the basic index information, is a timespan extending from the occurrence of a triggering action to an index start, and a timespan extending from the occurrence of a triggering action to an index end. The weight of the index is defined for the basic index information.

The basic index information defines information concerning the hierarchy for a single triggering index that is formed for a single triggering action, and the higher index is added when the lower index is added. For example, for a soccer video, when "centering", which is the lower index, is selected, the higher index, for "pass", can be added, and the basic index information included in the "pass" index can be applied.

Further, the basic index information defines information concerning the index that is formed by the effects produced by multiple triggering actions. For example, for a soccer video, "corner kick" and "goal", which are separate triggering actions, can be handled as continuous multiple triggering index information.

According to another aspect of the invention, an index generation method comprises the steps of: selecting a triggering action from among multiple triggering actions that are defined in advance and storing the triggering action; determining an index effective time range for the selected triggering action, based on a timespan extending from the occurrence of a triggering action to an index start and a timespan extending from the occurrence of a triggering action to an index end, the timespans being defined in advance; and generating an index corresponding to the triggering action based on the effective time range.

Another index for which a part, or all of the effective time range is determined is added to contents. Then, for example, different indexes, such as an index for team A and an index for team B, can be added to the same interval, and a digest that matches the tastes of a user can be generated.

For the timespan extending from the occurrence of the triggering action to the index start, and the timespan extending from the occurrence of the triggering action to the index end, a different value is defined in advance for each triggering action, and the effective time range is determined based on the defined value. Thus, when an event is designated, an index can be generated in accordance with a timespan that is important for video contents.

According to the present invention, an index generation apparatus for generating an index, which is data that describes contents, comprises: index data definition means for defining index data in advance; contents output means, such as a display device, for outputting contents to which the index is added; triggering action input means for receiving a triggering action relative to the contents; and index generation means for generating the index based on the index data defined by the index data definition means, and on the triggering action received by the triggering action input means.

The index data that is defined includes: triggering information that defines information concerning a triggering action; single triggering index information for determining an effective time range formed by the occurrence of a triggering action and the importance level of an index; multiple triggering index information that defines index data obtained by multiple triggering actions affecting each other; and additional information that defines information to be individually added to indexes.

The index generation apparatus further comprises: input history data storage means for storing the received triggering action as history; correction contents output means for employing the triggering action stored in the input history data storage means to display or output contents used for correction; and triggering action correction means for correcting the triggering action for the contents that is output by the correction contents output means. With this arrangement, an index adding person employs the output of a triggering action to be corrected or deleted to select and correct the desired triggering action.

According to another aspect of the invention, an index generation apparatus comprises: display means, for displaying video and for displaying a list of triggering action types that are registered in advance; and input means, for receiving, in accordance with the occurrence of a triggering action in the video displayed by the display means, a necessary triggering action from the list of the triggering action types.

The display means displays a list of additional information that are registered in advance, in addition to the list of triggering action types, and the input means receives necessary information that is selected based on the list of additional information that is displayed by the display means.

The index generation apparatus further comprises: processing means, for processing a triggering action input by the input means, wherein the processing means determines an effective time range for an index, including the times preceding and succeeding the occurrence of the received triggering action, and also determines the importance level of the index.

According to the present invention, an index addition system, for a contents provider that provides video contents, comprises: index addition means, for adding an index to contents, wherein the index addition means determines a triggering action, which acts as a trigger for an index addition, and adds the index using a timespan extending from the occurrence of the triggering action to an index start, and a timespan extending from the occurrence of the triggering action to an index end.

According to the invention, a program permits a computer to perform: a function for defining, in advance, basic index information, which is information concerning an index; and a function for generating the index through operating procedures using the basic index information, wherein the basic index information defines information concerning a triggering action and information concerning a starting time and an ending time that fall in a predetermined timespan beginning at the occurrence of the triggering action.

The basic index information defines information concerning the hierarchy of a single triggering index formed of a single triggering action, and information concerning an index that is formed by multiple triggering actions affecting each other.

According to an additional aspect of the invention, a program permits a computer to perform: a function for receiving a triggering action that is selected from among multiple triggering actions defined in advance; a function for determining an effective time range for an index based on a timespan extending from the occurrence of a triggering action to an index start, and a timespan extending from the occurrence of a triggering action to an index end, the timespans being defined in advance; and a function for employing the effective time range to generate an index corresponding to the triggering action.

These computer programs can be transmitted, via a network, by a program transmission apparatus at a remote location to a computer, such as a PC, that is provided for a contents provider. The program transmission apparatus need only comprise: storage means, such as a CD-ROM, a DVD, a memory or a hard disk, on which the program is stored; and transmission means, for reading the program from the storage means and for transmitting the program via a connector and a network, such as the Internet or a LAN.

These computer programs can be directly supplied from a storage medium, such as a CD-ROM or a DVD. In this case, a computer, such as a PC, whereat the program is installed need only have an included function for reading a storage medium, and can, for example, perform the above processes as one of the applications employed for the computer.

BRIEF DESCRIPTION OF THE DRAWINGS

FIGS. 4A and 4B are diagrams for explaining an example concept for a single triggering index information.

FIG. 5 is a diagram showing a first example of the basic index information for a soccer video.

FIGS. 18A and 18B are flowcharts showing the index addition and deletion processes.

FIG. 21 is a diagram showing basic index information for a baseball video.

PREFERRED EMBODIMENTS

The preferred embodiment of the present invention will now be described in detail while referring to the accompanying drawings.

Figure 1:
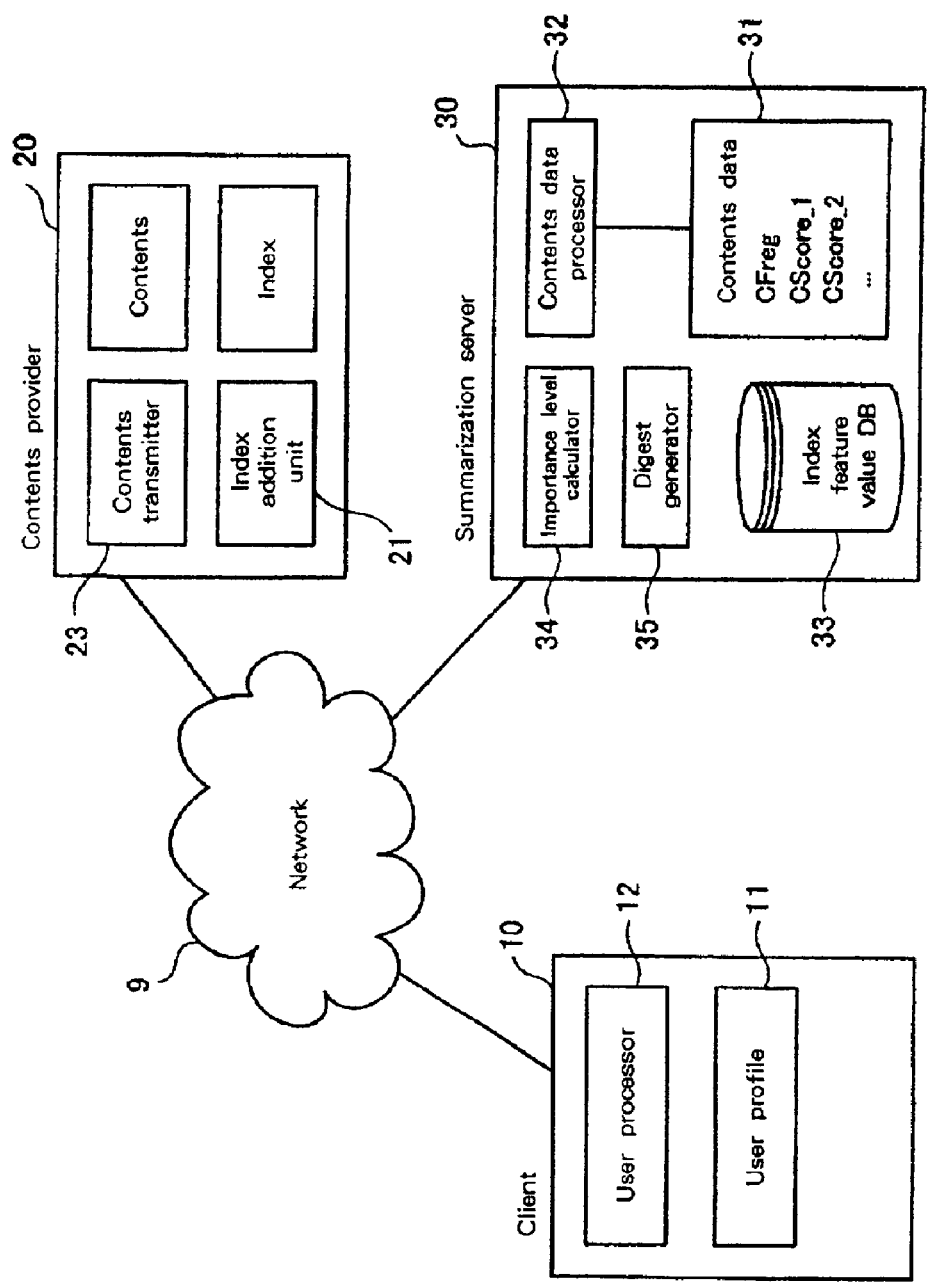
FIG. 1 is a schematic diagram for explaining the configuration of a network system according to one embodiment.

FIG. 1 is a schematic diagram for explaining the configuration of a network system according to the embodiment. The network system of this embodiment comprises: a client 10, which is provided for contents and which receives summarized (digested) contents via a network 9, the Internet, for example; a contents provider 20, which provides contents; and a summarization server 30, which summarizes the contents provided by the contents provider 20. The client 10, each contents provider 20 and the summarization server 30 is not always constituted by a single computer, and may be constituted by multiple computers. Either wire or radio can be used for communication among these components, and the client 10 can be, for example, a portable telephone or a PDA.

The client 10 includes: a user profile 11, in which feature values consisting of keywords, for example, are stored as personal interest information for a user; and a user processor 12, for receiving from a user requests to prepare contents scores as the initial values entered in the user profile 11, and for correcting the contents score in accordance with the audio-visual state or in response to a user's predetermined operation. The user processor 12 further includes a function for providing summarized contents for a user.

The contents provider 20 includes contents, such as video data or music data, various kinds of meaningful information for video, such as remark data for a scene and the scene starting and ending times used to designate the effective range of the scene, and indexes comprising data concerning the contents. Further, the contents provider 20 also includes an index addition unit (index generator) 21, for generating indexes to be added, and a contents transmitter 23 for transmitting summarized video and indexes via the network 9.

The summarization server 30 includes: contents data 31, which includes contents frequencies and contents scores; a contents data processor 32, for processing the contents data 31, e.g., calculating the frequency whereat a feature value appears in the index; an index feature value database (DB) 33, used to store the feature values for indexes prepared for all domains; an importance level calculator 34, for calculating the importance level of all contents; and a digest generator 35, for generating information relative to the summarized video that is generated from the contents.

The user processor 12 transmits, to the importance level calculator 34, the contents score, the summarized video viewing time for selected contents, and the user profile 11. Thereafter, the importance level calculator 34 transmits a summarized video transmission command to the contents transmitter 23; the digest generator 35 transmits the summarized video to the contents transmitter 23; and the contents transmitter 23 distributes the summarized video and the index to the user processor 12. Further, the contents transmitter 23 transmits to the contents data processor 32 the list of contents scores concerning the contents. It should be noted that this transmission is not required when the contents score is prepared by the summarization server 30, and the user processor 12 transmits the user profile 11 to the contents data processor 32. At the client 10, while the contents are being viewed, favorite scenes are registered for inclusion in the user profile 11, and when the viewing of the contents has been completed, the user profile 11 is updated.

Figure 2:
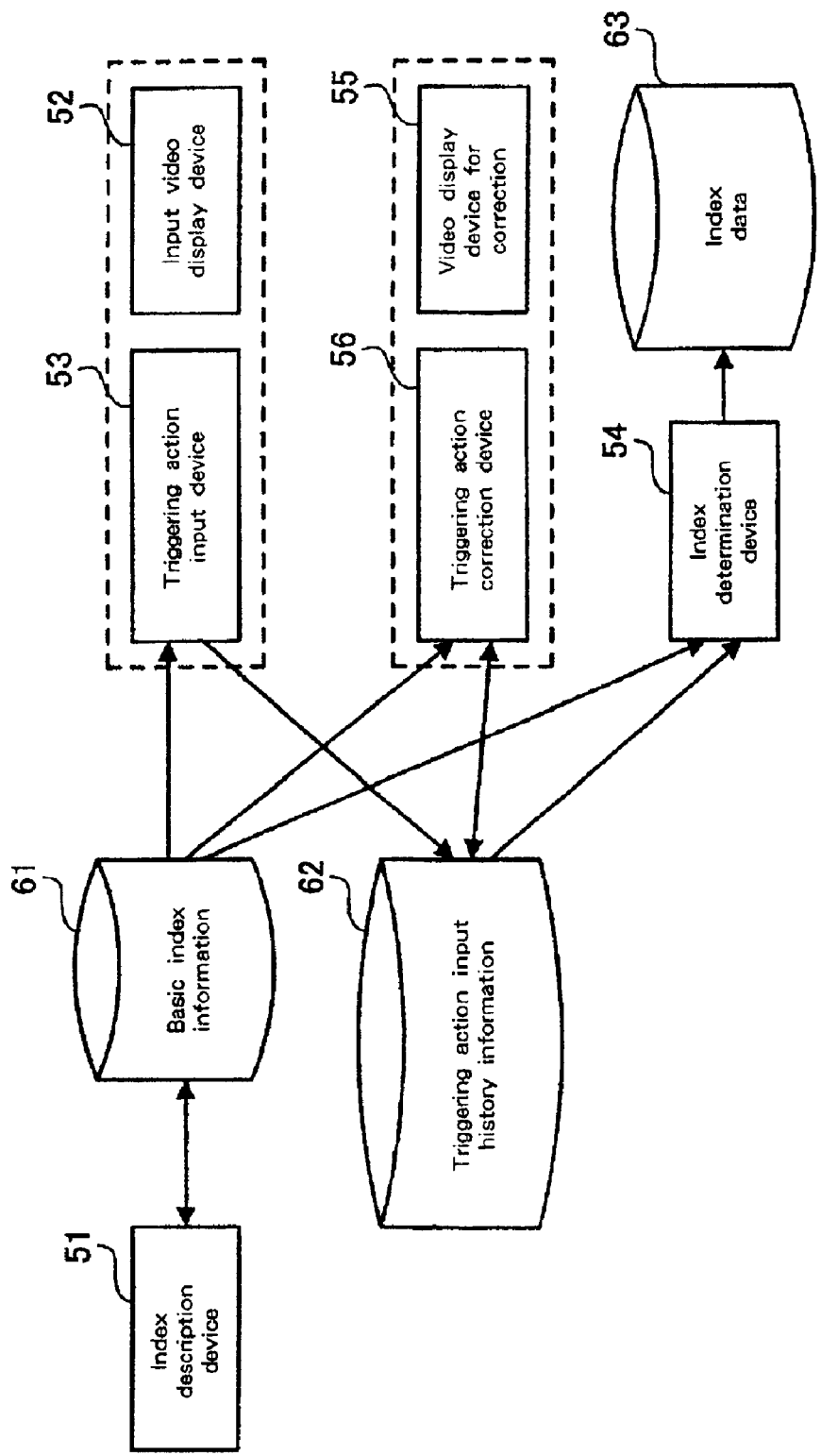
FIG. 2 is a block diagram showing the configuration of an index addition unit (index generator) in a contents provider.

FIG. 2 is a block diagram showing the configuration of an index addition unit (index generator) 21 in the contents provider 20. The index addition unit 21 in this embodiment stores: basic index information 61 concerning indexes defined in advance; triggering action input history information 62, which cumulatively includes the types of triggering actions input plus additional information; and index data 63, which is actually input by an index adding person.

Furthermore, the index addition unit 21 includes: an index description device 51, for defining the basic index information 61 input by the index adding person; an input video display device 52, for displaying actual video; and a triggering action input device 53, used by an index adding person to sequentially enter, during the screening of a video, triggering actions that are found and that subsequently are cumulatively added to the triggering action input history information 62. The index addition unit 21 further includes: an index determination device 54, for generating an index based on the basic index information 61 and the triggering action histories cumulatively stored in the triggering action input history information 62, while taking into account the weight along a time axis; a video display device 55 for performing corrections, which employs the triggering action histories cumulatively stored in the triggering action input history information 62 to display video to be corrected; and a triggering action correction device 56, for correcting or deleting selected triggering actions included in a triggering action list.

The triggering action input device 53 receives types and additional relevant information for triggering actions based on the triggering action information defined in the basic index information 61. In this embodiment, as the operating procedures that use the basic index information 61, first, a list of triggering action types that are defined in advance as data for the basic index information 61 and a list of additional information are displayed on the video display device 52 used for input. The index adding person then employs the triggering action input device 53 to select necessary information from the lists each time a triggering action occurs. The index determination device 54 identifies the information selected by the index adding person, generates a value for a triggering index, and stores the value with other values cumulatively stored in the index data 63. As will be described later, when the index determination device 54 adds the lower index, it can automatically add the higher index, so that different and independent indexes can be added for the same interval.

Figure 3:
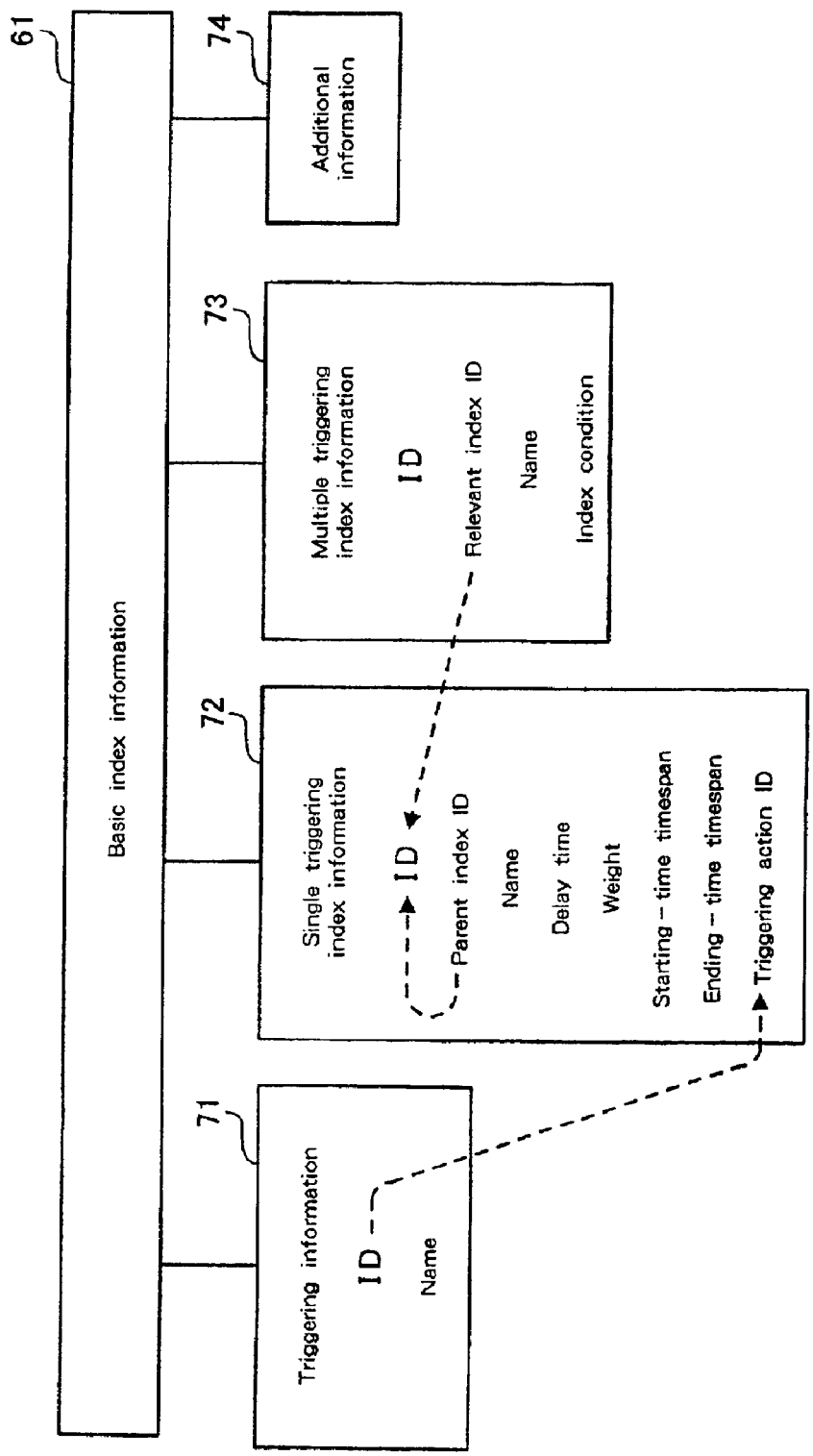
FIG. 3 is a diagram for explaining basic index information.

FIG. 3 is a diagram for explaining the basic index information 61. When strict limitations imposed by a charge system apply for a portable terminal, such as a portable telephone or a PDA, it is important that the distribution of unnecessary video be avoided, and the reliability of the index is vitally important to a contents provider 20 that distributes digests. At present, reliable indexes must be manually added to a video in real time; however, to perform this task from beginning to end is extremely difficult. Thus, in this embodiment, the basic index information 61, including data for index information concerning indexes, is defined in advance, and an easy operation using the basic index information 61 is provided that reduces the labor required of an index adding person. Thus, index addition in real time can be implemented.

The basic index information 61 consists of four types of information: triggering information 71, such as an ID or a name that defines information concerning a triggering action; single triggering index information 72, which defines information concerning an index formed using only a single triggering action; multiple triggering index information 73, which defines information concerning an index formed by the effects produced by the interaction of multiple triggering actions; and additional information 74, which defines information to be added to individual indexes.

In this embodiment, when an index addition person identifies the occurrence of a triggering action while screening a video, a corresponding triggering action is selected from among those defined in advance. However, the timespan of the index can not be determined merely by selecting a triggering action at a specific point in the video. Thus, the single triggering index information 72 defines an ID, a parent index ID, a name, a delay terminating upon the identification and entry of a triggering action by an index adding person, the weight assigned to an index, timespans, one extending from a triggering action occurrence to the start of an index (a starting-time timespan) and another extending likewise but to the end of the index (an ending-time timespan), and a triggering action ID. When the portion of a video preceding a triggering action is important, only the timespan terminating at the start of an index need be increased, and when the portion of a video following a triggering action is important, only the timespan terminating at the end of an index need be increased. The weight of individual indexes is provided for scaling purposes, and is used to indicate the relative importance levels of the indexes.

For a soccer video, for example, it can easily be guessed that for a digest the index for a goal scene will be more important than the index for a pass. And when this information is employed, an effective time range for an index consisting of a single triggering action and an importance level assigned to the index (hereinafter referred to as an index weight) can be determined. For the single triggering index information 72, the single triggering indexes can be hierarchically structured, and a pointer can also be included to a parent single triggering index. Thus, at the time a lower index is added a higher index can also be added.

The multiple triggering index information 73 is used when there is an index that can not be satisfactorily expressed by a single triggering action and for which multiple triggering actions should be taken into account. However, since this situation is limited, relationships established by multiple triggering actions are picked up, and are defined in advance by using the multiple triggering index information 73. For example, for a scene in a soccer video wherein a score is made following a corner kick, different indexes are required for the corner kick scene and the goal scene. If these indexes are separately obtained, it is difficult for the scene of a goal following a corner kick to be included in a digest for an index user for whom the designated favorite scenes are goal scenes. Therefore, if the two indexes are collectively regarded as an index for a goal scene, an effective digest can be efficiently generated.

The multiple triggering index information 73 defines an ID, a name, a relevant index ID and a condition for indexes that affect each other. For example, the index condition is defined by repeating one or more index groups, and an index group is defined by employing the product of a predetermined condition and a single triggering index. This predetermined condition can be, for example, a time limit, and may not be present. The predetermined condition is used for the determination of a condition existing between preceding and succeeding single triggering indexes.

The additional information 74 defines information to be added to individual indexes. When a triggering action is input, only an index representing an action can be added to a video; other information can not. For example, for a soccer video, indexes representing actions, such as passes or shots, can be added to the video; however, the teams making the passes or shots are not identified. By using the additional information 74, data required for this purpose can be defined.

Further, multiple sets of additional information 74 can be defined. When, for example, an index not only for each team but also for each player is taken into account, only two sets of additional information 74 for a team and a player need be defined. When these data are handled as one index in addition to an index that expresses an action, a more detailed digest can be generated that matches the tastes of an index user.

FIGS. 4A and 4B are diagrams for explaining one concept of the single triggering index information 72. In FIG. 4A, a video sequence preceding a triggering action is regarded as important, and in FIG. 4b, a video sequence following a triggering action is regarded as important. A triggering action occurrence time A and an input time B for the input by an index adding person are defined, and a delay time d is defined between A and B. Further, a weight w is defined for each triggering action, as are a starting-time timespan s and an ending-time timespan e. When as in FIG. 4A the video sequence preceding the triggering action is regarded as important, the starting-time timespan s is extended, and the ending-time timespan e is shortened. While when as in FIG. 4B the video sequence following the triggering action is regarded as important, the starting-time timespan s is reduced and the ending-time timespan e is increased.

The processing will now be described while referring to FIG. 2. While an index adding person is viewing a video on the input video display device 52, upon the occurrence of a triggering action the person enters the type of triggering action and relevant additional information by using the triggering action input device 53. Until the video used for the display on the input video display device 52 is ended, the index adding person continuously selects a triggering action type each time a triggering action occurs. The triggering action types and the additional information that are entered are accumulated as triggering action input history information 62, together with the times whereat they were selected.

The index determination device 54 employs the basic index information 61 defined in advance and the triggering action input history information 62 to calculate the effective time range for the single triggering index and its index weight. The index weight is so set that it is reduced farther along the time axis following the time at which the triggering action was input, and reaches 0 at the boundary of the effective time range. When two triggering actions having the same additional information are arranged at a time interval that is shorter than the total time allocated for the starting-time timespan s and the ending-time timespan e, which are defined in the basic index information 61, the indexes overlap; however, this is not taken into account in the process wherein an index is added. The index determination device 54 accumulates the thus obtained single triggering index as index data 63, and when a lower single triggering index is added, based on the hierarchical arrangement of the single triggering indexes, a higher single triggering index is also accumulated as index data 63.

Then, the index determination device 54 determines the index condition for the multiple triggering index information 73. When the index condition is matched, the multiple triggering index having that condition is also accumulated as index data 63. Basically, the index weight of a single triggering index is employed as the index weight for a multiple triggering index, and is corrected so that the video sequence between the single triggering indexes can be regarded as important.

Since an error may occur during the addition of an index in real time, the video display device 55 employed for corrections and the triggering action correction device 56 can add, delete or correct the input index. A different device from the triggering action input device 53 may be employed because the addition, deletion or correction of an input index can be performed without interrupting the index addition process in real time. The triggering action correction device 56 is so designed that it corrects or deletes a triggering action selected from the triggering action list, while the video display device 55 employed for corrections is so designed that the beginning of a video can be provided by designating a time, so that, when a triggering action is to be corrected or deleted, the video preceding and succeeding the selected triggering action can be checked. When an index adding person finds a triggering action for an index to be corrected while screening the video displayed on the video display device 55 employed for correction, the index adding person need only enter the triggering action type and the additional information. This input method is performed in the same manner as is the triggering action input device 53.

The embodiment of the invention will now be described more in detail by using a specific example. In this example, three index addition examples for a soccer video and one index addition example for a baseball video are employed. When it is assumed that there is an index adding person, such as the contents provider 20, who is well acquainted with various types of video, the delay time d extending from the occurrence of the triggering action to the input of the triggering action is extremely small, so that in this example the delay time d≈0. Further, assume that a list of triggering action types and a list of additional information are displayed as interfaces for the triggering action input device 53, and that the index adding person selects required information from these lists. In addition to the preceding interfaces for the triggering action input device 53, a list of triggering action input history information 62 that has been input and a list of added indexes are also displayed as interfaces for the triggering action correction device 56. The index adding person can correct the index by selecting a desired triggering action for correction or deletion.

EXAMPLE 1

First Example for Soccer Video

FIG. 5 is a diagram showing a first example for the basic index information 61 of a soccer video. An index adding person who uses the index addition unit 21 employs the index description device 51 to define the basic index information 61 concerning the soccer video shown in FIG. 5. In this example, triggering actions that occur in the soccer video and indexes that are identified by the triggering actions are shown. Further, the IDs and the names are defined as triggering information 71-1; e.g., ID1 is Pass, ID2 is ThroughPass, ID3 is Centering, ID4 is Shoot and ID5 is CornerKick.

In the single triggering index information 72-1, for each ID the hierarchy is defined by using a ParentID that represents the parental relationship. Further, the weight w (Weight), the delay time d (Delay), the starting-time timespan s (Start), the ending-time timespan e (End) and the triggering action ID (Trigger) are defined. In this example, ThroughPass ID2 and Centering ID3 are hierarchically provided for Pass ID1, and Goal ID5 is hierarchically provided for Shoot ID4.

In the multiple triggering index information 73-1, a relevant index is presented for each ID; for example, Corner-Goal ID1 is correlated with Goal ID5 in the single triggering index information 72-1. In addition, an index condition (Condition) is defined. For CornerGoal, for example, when the time from CornerKick ID6 to Goal ID5 is within 10 seconds (s), this index condition is established. In the additional information 74-1, team A (TeamA), team B (TeamB) and player names are defined.

Figure 6:
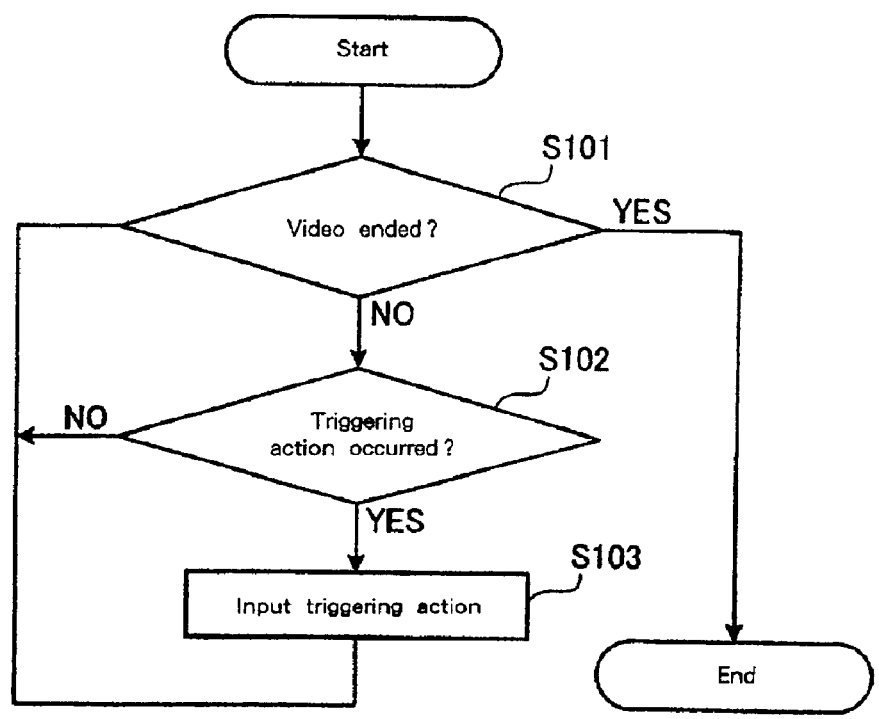
FIG. 6 is a flowchart showing a triggering action input algorithm.

FIG. 6 is a flowchart showing a triggering action input algorithm. An index adding person, while viewing a video on the input video display device 52, uses the triggering action input device 53 to select a triggering action type and additional information each time a triggering action occurs, up until the video has ended. That is, a check is performed to determine whether the video has ended (step 101), and if the video has ended, the input algorithm is terminated. But if the video has not yet ended, the checking performed to determine whether a triggering action has occurred (step 102) is repeated. When a triggering action does not occur, program control repeatedly returns to step 101, until the video ends. But each time a triggering action occurs, a triggering action type is input (step 103) before program control returns to step 101.

Figure 7:
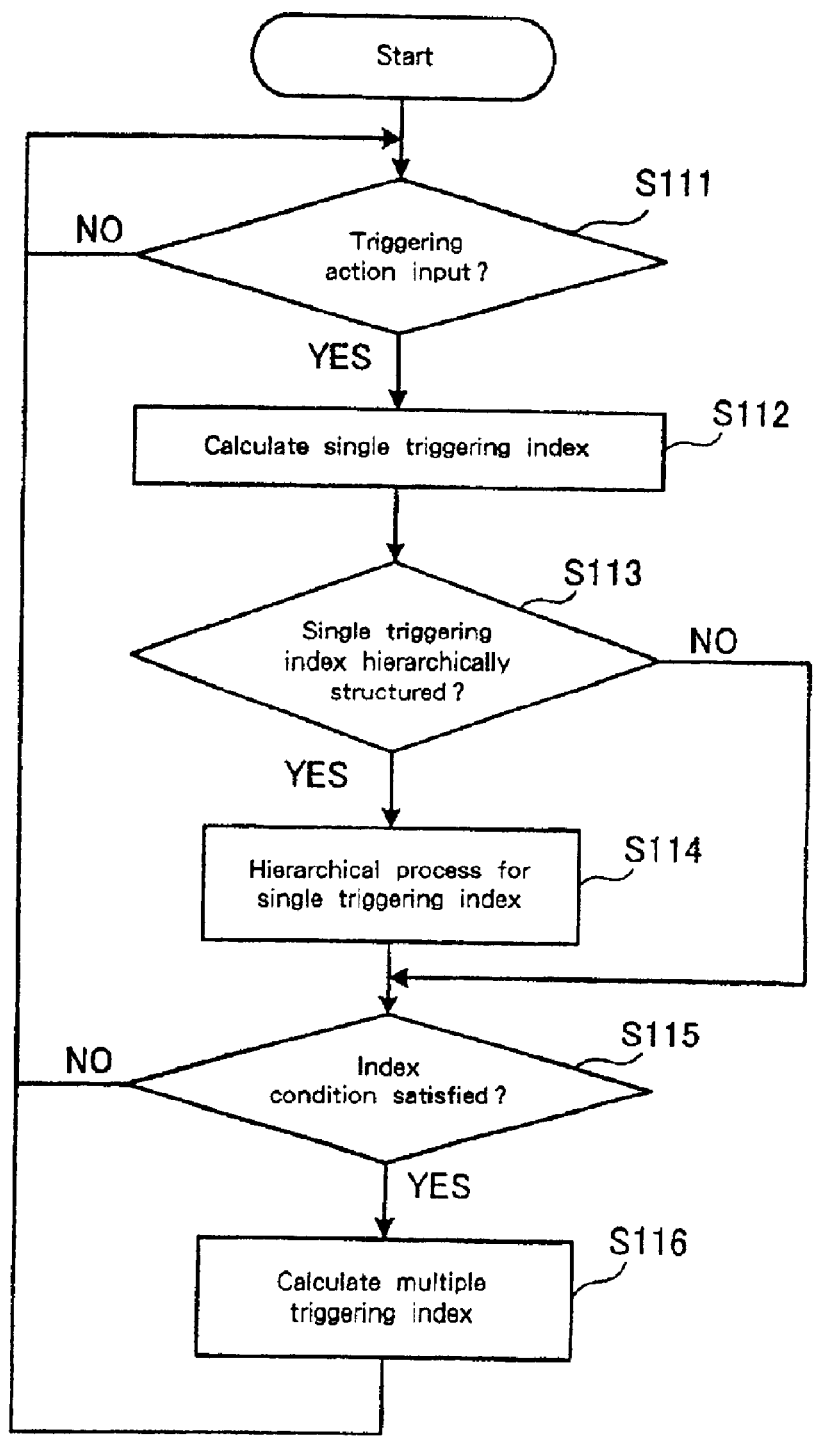
FIG. 7 is a diagram showing an index determination algorithm used by an index determination device.

FIG. 7 is a flowchart showing an index determination algorithm for the operation performed by the index determination device 54. First, a check is performed to determine whether a triggering action has been input (step 111), and if a triggering action has not been input, the entry of a triggering action is waited for. When a triggering action has been input, a single triggering index is calculated (step 112). Then, a check is performed to determine whether the single triggering index has a hierarchical structure (step 113). When the single triggering index has a hierarchical structure, the single triggering index hierarchy process is performed (step 114), and a check is then made to determine whether an index condition has been established (step 115). If the single triggering index does not have a hierarchical structure, however, program control is shifted to step 115, and if an index condition is established there, the multiple triggering index is calculated (step 116) and program control returns to step 111. Whereas if at step 115 no index condition is established, program control returns immediately to step 111.

Figure 8:
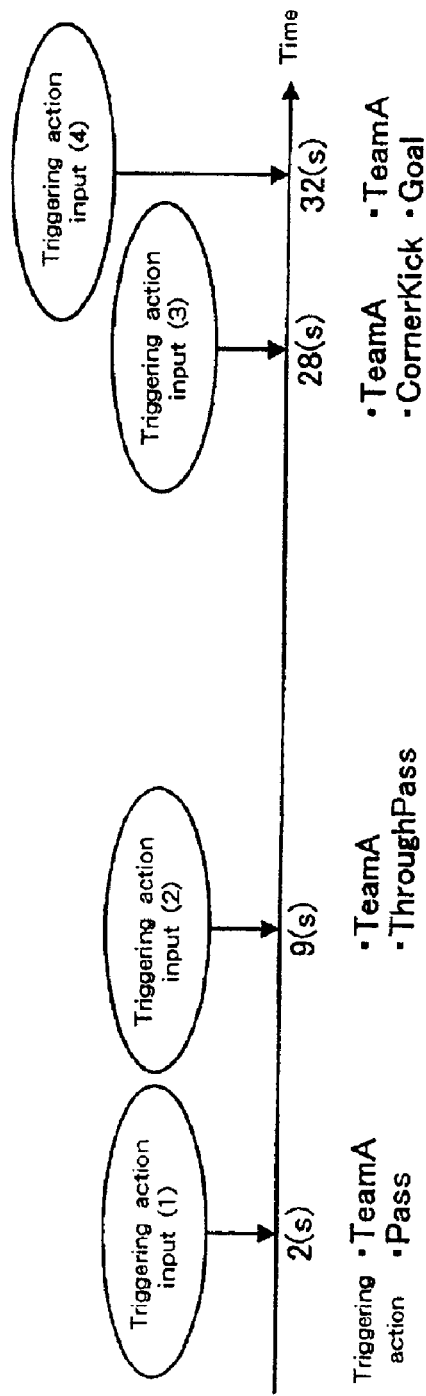
FIG. 8 is a diagram showing triggering action input examples.

FIG. 8 is a diagram showing an example wherein a triggering action is input in accordance with a determination made at step 111 in FIG. 7. In FIG. 8, triggering action input examples (1) to (4) are shown along a time axis. The processing performed by the index determination device 54 will now be described based on the triggering action input examples in FIG. 8.

First, triggering action input (1) will be described. In this case, at time t=2(s) the index adding person finds a triggering action for a pass (Pass) by team A (TeamA), selects TeamA from the additional information list presented by the triggering action input device 53, and selects Pass from the triggering action list. Through this process, the triggering action is input to the device 53, and the index determination device 54 processes the triggering action using the index determination algorithm shown in FIG. 7. In the index determination algorithm, first, the single triggering index calculation at step 112 is performed using a predetermined algorithm, and the effective time range for the Pass index and its index weight are obtained.

Figure 9:
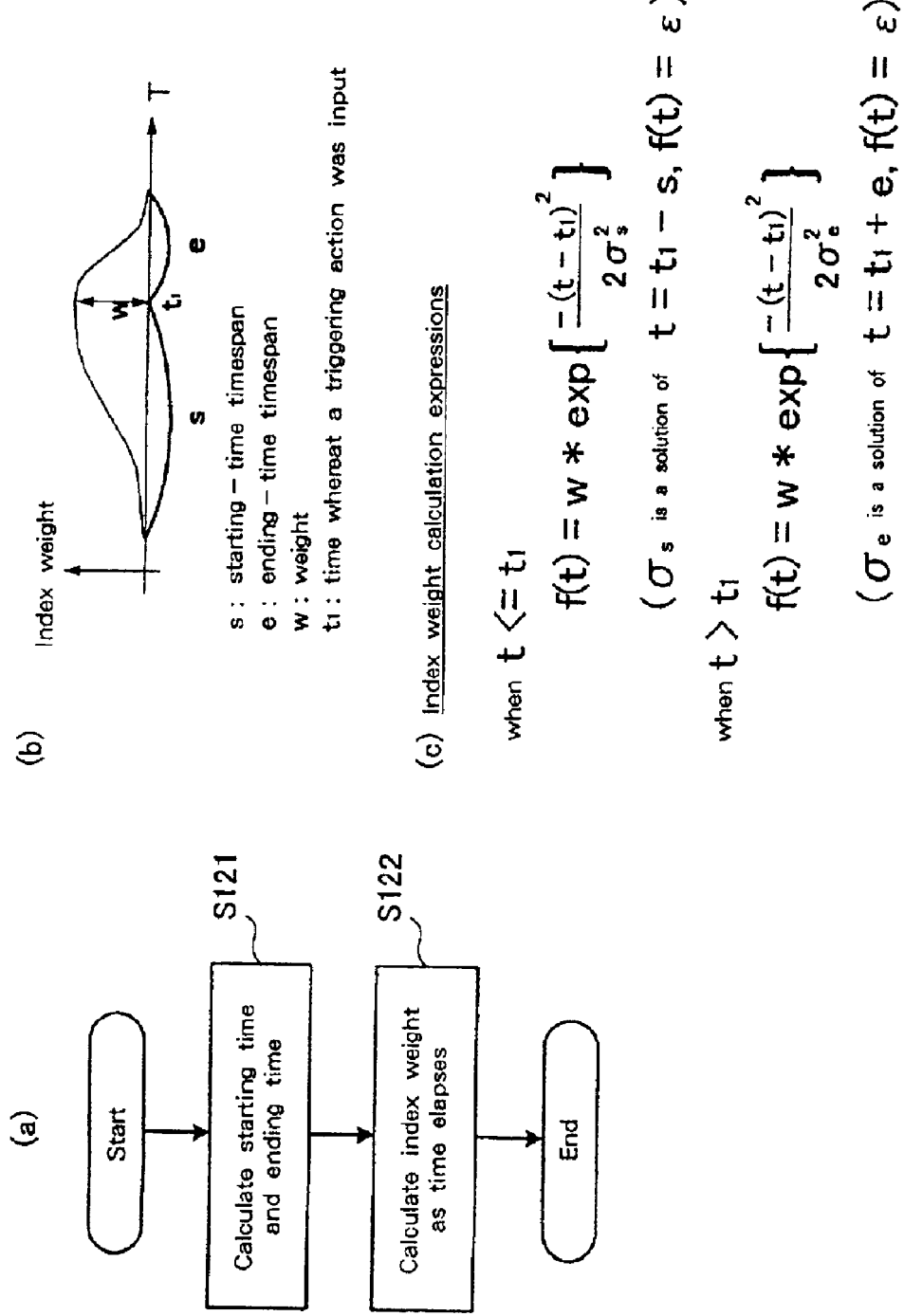
FIGS. 9A to 9C are diagrams for explaining an algorithm for a single triggering index calculation performed in FIG. 7.

FIGS. 9A to 9C are a flowchart and diagrams for explaining the single triggering index calculation at step 112 in FIG. 7. In FIG. 9A, for the single triggering index calculation, first a starting time and an ending time are calculated (step 121), and as time elapses, the index weight is calculated (step 122). In FIG. 9B, the values used for the index weight calculation are explained, with $t_1$ indicating the time whereat the triggering action was input. The other values are the same as those explained while referring to FIGS. 4A and 4B. In FIG. 9C, the calculation expressions for the index weight are shown for when time t falls before $t_1$ and for when time t falls after $t_1$. f(t) is a curve shown in FIG. 9B. Both ends of the index are defined as cases wherein the index weight is equal to or smaller than $\epsilon$, and a specific constant value is defined as $\epsilon$. In this case, $\epsilon$ is $1/e^4$.

According to the information for Pass in FIG. 5, w=1, s=2(s) and e=0.5(s), and when these values are substituted into the index calculations in FIG. 9C, $$t \leq 2, f(t) = 1 \times \exp\{-(t-2)^2\} \left( \because \sigma_s^2 = \frac{1}{2} \right) \quad \text{[Expression 1]}$$

$$t > 2, f(t) = 1 \times \exp\{-16(t-2)^2\} \left( \because \sigma_e^2 = \frac{1}{32} \right)$$

Since the single triggering indexes are hierarchically structured for the basic index information 61, the process is performed for the hierarchical process algorithm at step 114 in FIG. 7. However, since the index for Pass is higher, an automatic index addition based on the hierarchy is not performed. In addition, since the Pass index is not defined in the multiple triggering index information 73 for the index condition, the multiple triggering index calculation at step 116 in FIG. 7 is also not performed for the basic index information 61.

Figure 10:
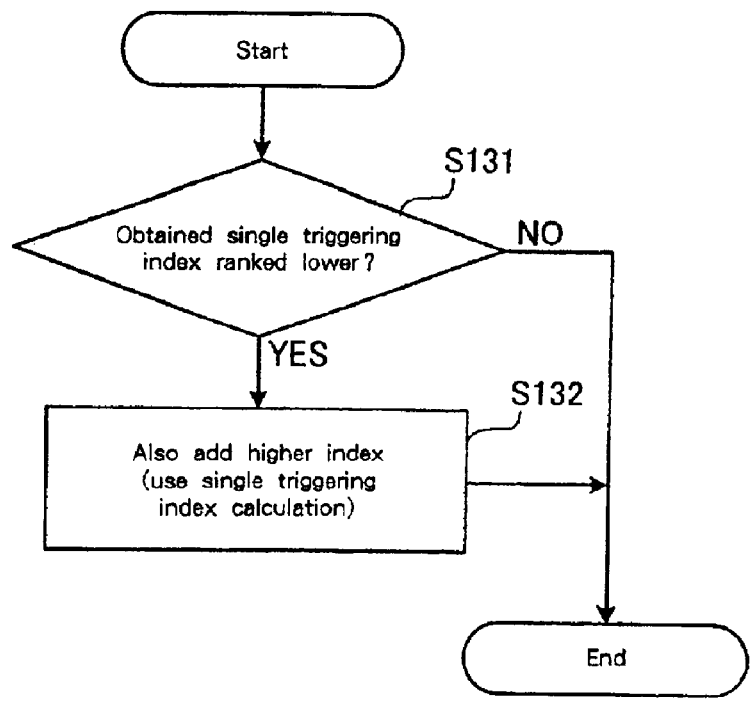
FIG. 10 is a flowchart showing a hierarchical process algorithm in FIG. 7.

FIG. 10 is a diagram showing the hierarchical process algorithm at step 114 in FIG. 7. Since the single triggering indexes are hierarchically structured for the basic index information 61, the process is performed based on the hierarchical process algorithm in FIG. 10. With this algorithm, first, a check is performed to determine whether the obtained single triggering index is a lower index (step 131). When the single triggering index is not a lower index, the processing is terminated. When the single triggering index is a lower index, however, a higher index is also added (step 132) and the processing is terminated. The single triggering index calculation in FIG. 9C is employed for step 132.

Triggering action input (2) in FIG. 8 will now be described. In this case, at time t=9(s) the index adding person finds a triggering action for a through pass (ThroughPass) by team A (TeamA), selects TeamA from the additional information list presented by the triggering action input device 53, and selects ThroughPass from the triggering action list. Thus, the index determination device 54 processes the triggering action using the index determination algorithm shown in FIG. 7.

As for the triggering action input (1), first, the effective time range for the ThroughPass index and its index weight are obtained by the single triggering index calculation algorithm in FIGS. 9A to 9C. Then, the process is performed based on the hierarchical process algorithm in FIG. 10. Since the ThroughPass index is a lower index, based on the hierarchical structure, the Pass index is also automatically added. The Pass index addition process is performed in accordance with the single triggering index addition procedures. In the basic index information 61, there is a multiple triggering index wherein the ThroughPass index is related to the index condition; however, since the Shoot index is not currently present, the index condition is not established and the multiple triggering index calculation is not performed.

Figure 11:
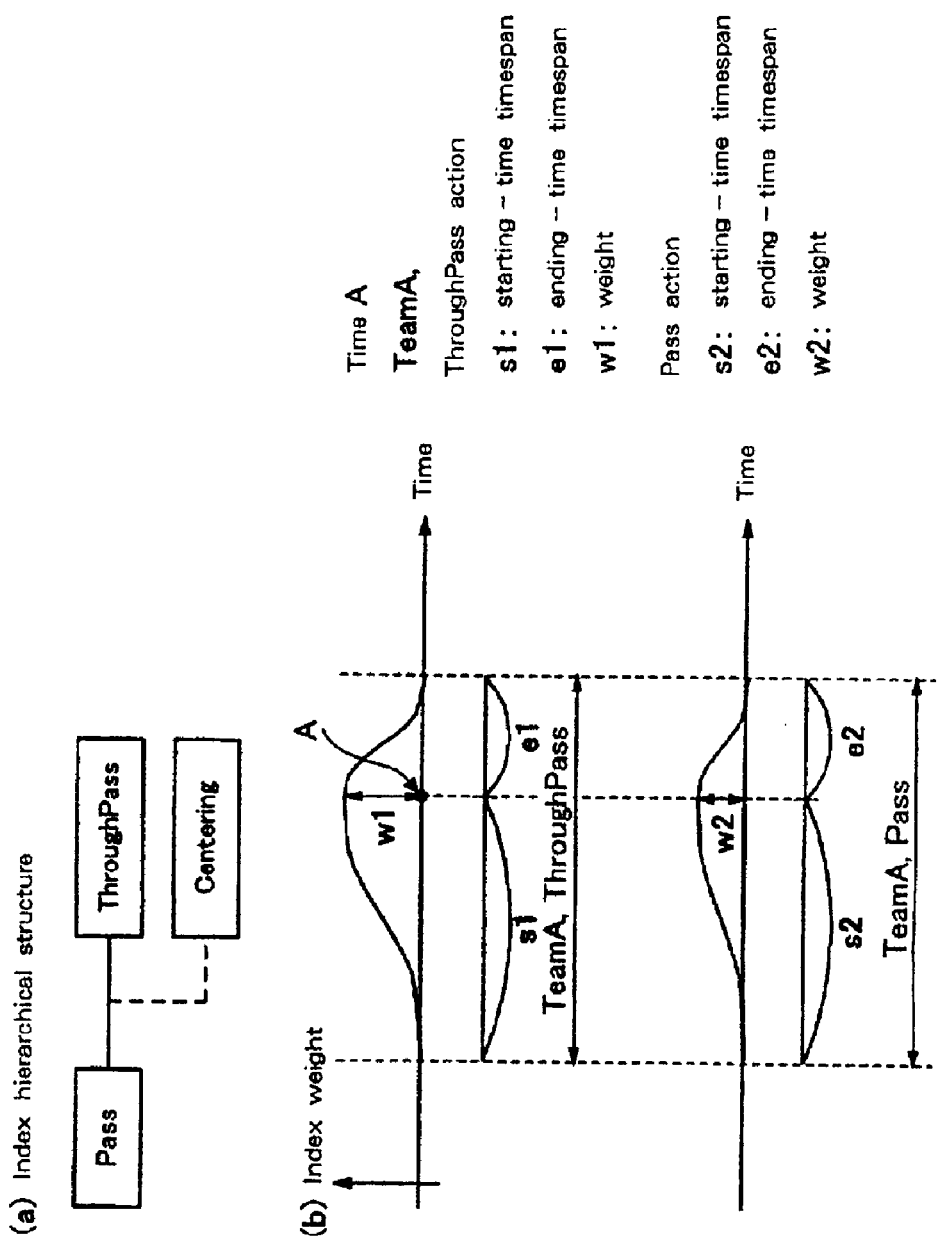
FIGS. 11A and 11B are diagrams showing index addition examples based on a hierarchy.

FIGS. 11A and 11B are diagrams showing index addition examples based on the hierarchical structure. As is shown in FIG. 11A, the ThroughPass index and the Pass index are hierarchically structured, and the Pass index is higher and the ThroughPass index is lower, as also is the Centering index. As is shown in FIG. 11B, at time A, the ThroughPass action occurs, and the Pass index is added in accordance with the current starting-time timespan (s1) and ending-time timespan (e1).

Triggering action input (3) in FIG. 8 will now be described. In this case, at time t=28 (s) the index adding person finds a triggering action for a corner kick (CornerKick) by team A (TeamA), selects TeamA from the additional information list presented by the triggering action input device 53, and selects CornerKick from the triggering action list. Thus, the index determination device 54 processes the triggering action using the index determination algorithm shown in FIG. 7.

In the same manner as for triggering action input (1), first, the effective time range for the CornerKick index and its index weight are obtained by the single triggering index calculation algorithm in FIGS. 9A to 9C. Since the CornerKick index is not hierarchically structured, and the multiple triggering index wherein the CornerKick index is related to the index condition is not present, the index hierarchical process and the multiple triggering index calculation are not performed.

Triggering action input (4) in FIG. 8 will now be described. In this case, at time t=32 (s) the index adding person finds a triggering action for a goal (Goal) by team A (TeamA), selects TeamA from the additional information list presented by the triggering action input device 53, and selects Goal from the triggering action list. Thus, the index determination device 54 processes the triggering action using the index determination algorithm shown in FIG. 7.

In the same manner as for triggering action input (1), first, the effective time range for the Goal index and its index weight are obtained using the single triggering index calculation algorithm in FIGS. 9A to 9C. Then, in the same manner as for triggering action input (2), the process is performed based on the hierarchical process algorithm in FIG. 10, and the Shoot index, which is ranked higher than the Goal index, is also automatically added.

Finally, in the triggering action input (4), since the multiple triggering index is present wherein the Goal index is related to the index condition, and since the following expression is satisfied when the index condition is compared with the index condition (Condition) of CornerGoal, which in the multiple triggering index information in FIG. 5 is ID1, 32(Goal triggering action occurrence time)−28 (CornerKick triggering action occurrence time)=4 s (<10 s), [Expression 2]

the index weight is calculated by using the multiple triggering index calculation algorithm in FIGS. 12A–12C, which will be described later.

FIGS. 12A to 12C are a flowchart and diagrams for explaining the multiple triggering index calculation performed at step 116 in FIG. 7. In FIG. 12A, for the multiple triggering index calculation, first, a starting time and an ending time are calculated (step 141), and the index weight as time elapses is calculated (step 142). In FIG. 12B the values used for the index weight calculation are explained, and in this case, a triggering action occurred at times $t_1$ and $t_2$. In FIG. 12C, the index weight calculation expressions are shown, and curve f(t) in FIG. 12B is obtained for a case wherein time t falls before $t_1$, a case where time t falls between $t_1$ and $t_2$, and a case wherein time t falls after $t_2$. It should be noted that $\epsilon=1/e^4$.

When the case for the triggering action input (4) is calculated while referring to FIGS. 12A to 12C, by referring to FIG. 5, the CornerKick index has a weight w1=2 and starting-time timespan s1=0.5(s), and the Goal index has a weight w2=4 and ending-time timespan e2=0.5(s). When these values are substituted into the index weight calculation expressions in FIG. 12C, $$t \leq 28, \ f(t) = 2 \times \exp\{-4(4+\log_e 2)(t-28)^2\}\left(\because \sigma_s^2 = \frac{1}{8(4+\log_e 2)}\right) \quad [\text{Expression 3}]$$

$$28 < t \leq 32, \ f(t) = 2 \times \exp\left\{\frac{-(4+\log_e 2)(t-32)^2}{16}\right\} + 2\left(\because \sigma_m^2 = \frac{8}{4+\log_e 2}\right)$$

$$t > 32, \ f(t) = 4 \times \exp\{-8(2+\log_e 2)(t-32)^2\}\left(\because \sigma_e^2 = \frac{1}{16(2+\log_e 2)}\right)$$

Figure 13:
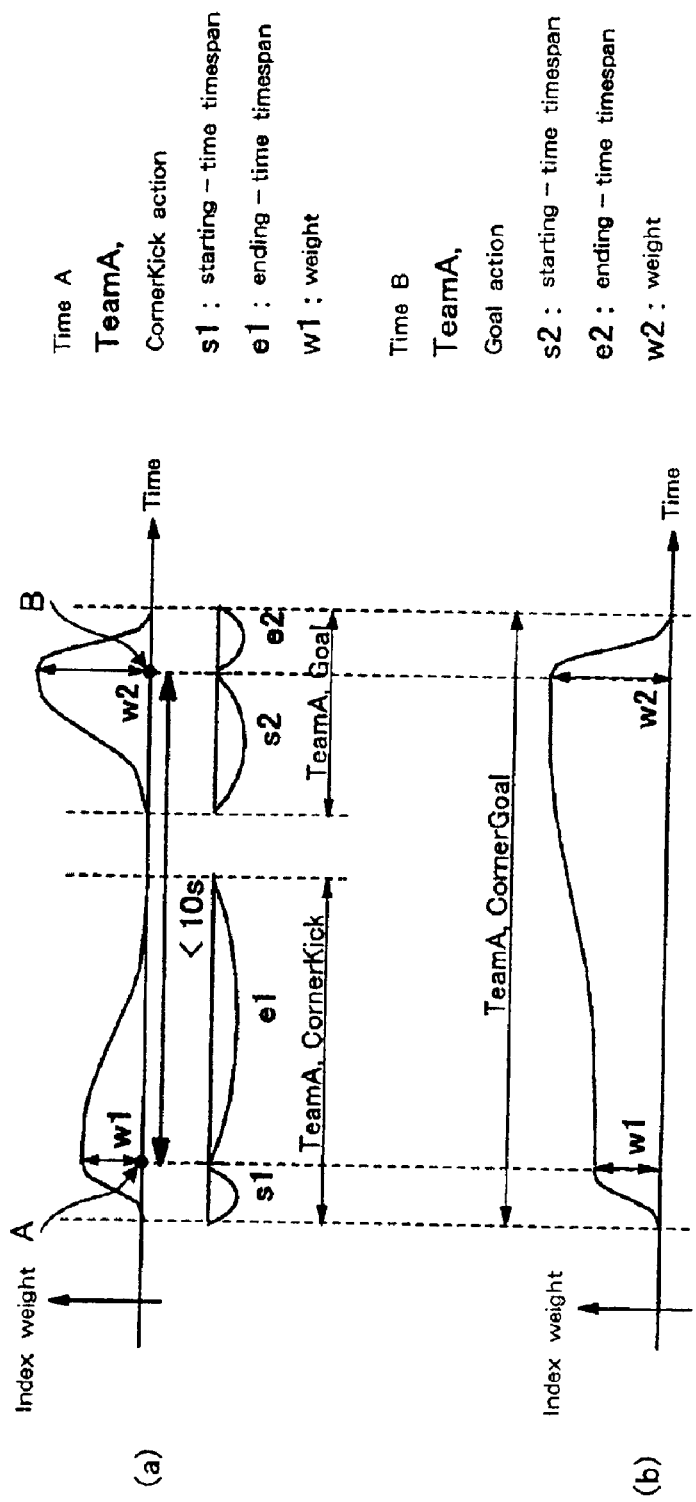
FIGS. 13A and 13B are diagrams showing an example of generation of a multiple triggering index.

FIGS. 13A and 13B are diagrams showing an example for the generation of a multiple triggering index. In FIG. 13A, a single triggering index is generated, and in FIG. 13B, a multiple triggering index is obtained using expression 3. As is shown in FIG. 13B, indexes that satisfy the index condition and that affect each other by generating a multiple triggering index can be generated as a single index.

Figure 14:
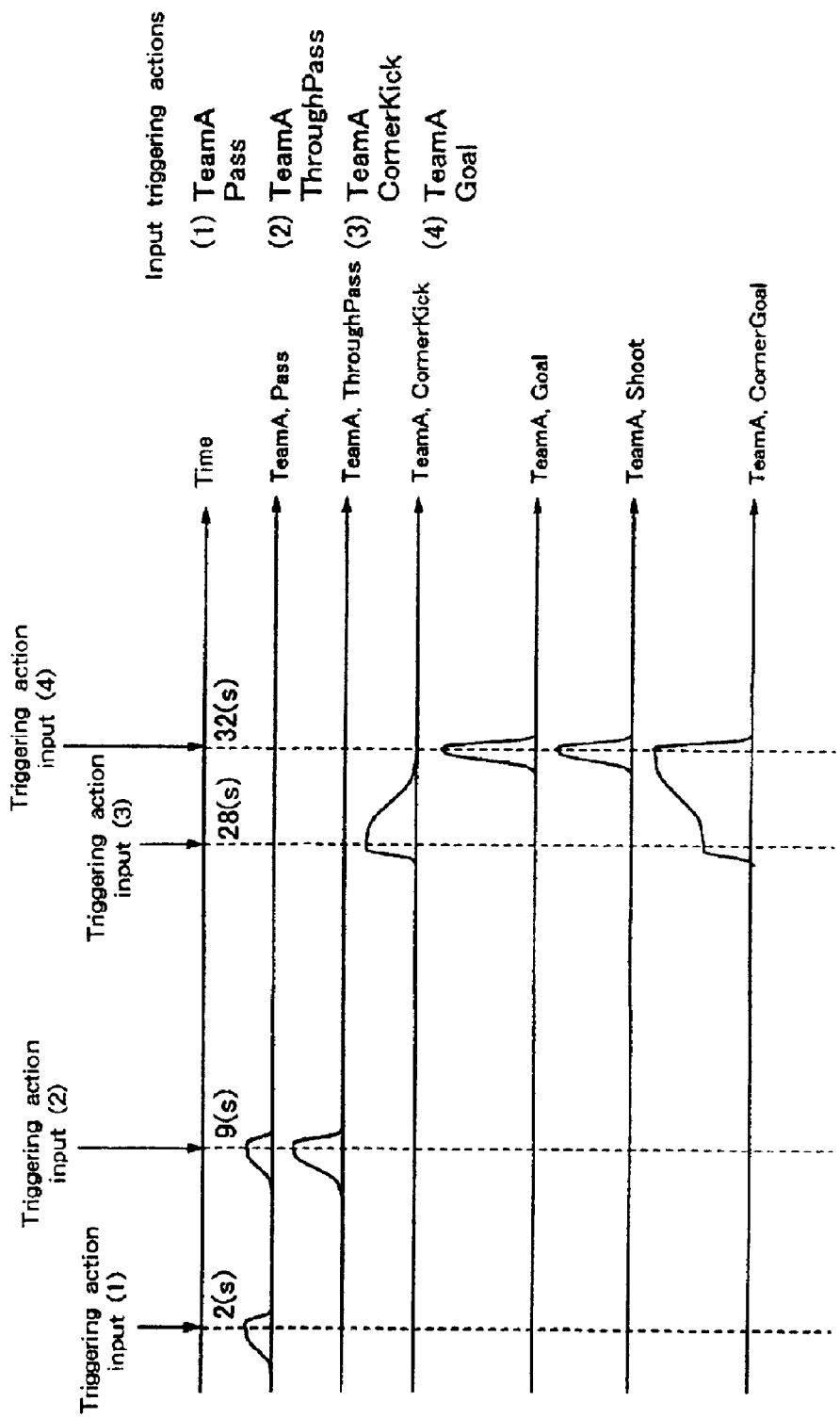
FIG. 14 is a diagram showing indexes that are added in accordance with triggering action inputs (1) to (4) in FIG. 8.

FIG. 14 is a diagram showing indexes that are added, through the above processing sequence, from the triggering action inputs (1) to (4) in FIG. 8. For example, in the triggering action input (2), the Pass index, which is ranked higher than the ThroughPass index, is automatically added, and in the triggering action input (4), the Shoot index, which is ranked higher than the Goal index, is also automatically added. Further, in the triggering action inputs (3) and (4), the CornerGoal index, which is a multiple triggering index type, is generated.

EXAMPLE 2

Second Example for Soccer Video

Figure 15:
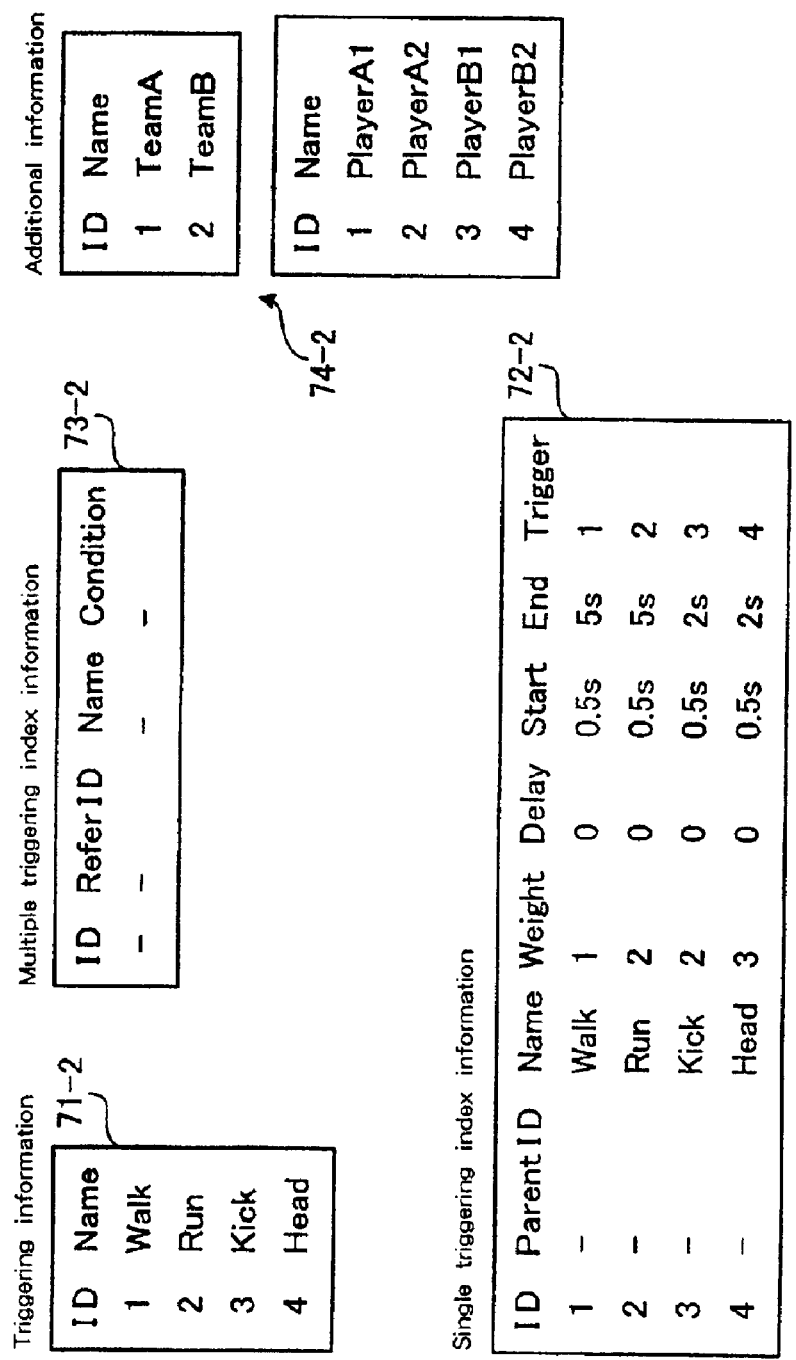
FIG. 15 is a diagram showing a second example of the basic index information for a soccer video.

FIG. 15 is a diagram showing a second example for the basic index information 61 of the soccer video. As in example 1, the index adding person employs the index description device 51 to define the basic index information 61 concerning the soccer video. In FIG. 15, the indexes are defined in more detail than in FIG. 5 by including the movements of players.

For the addition of an index based on the movement of each player, independent multiple indexes may be present at a specific time interval because the players move individually. In this example, triggering information 71-2, single triggering index information 72-2, multiple triggering index information 73-2 and additional information 74-2 are defined.

Figure 16:
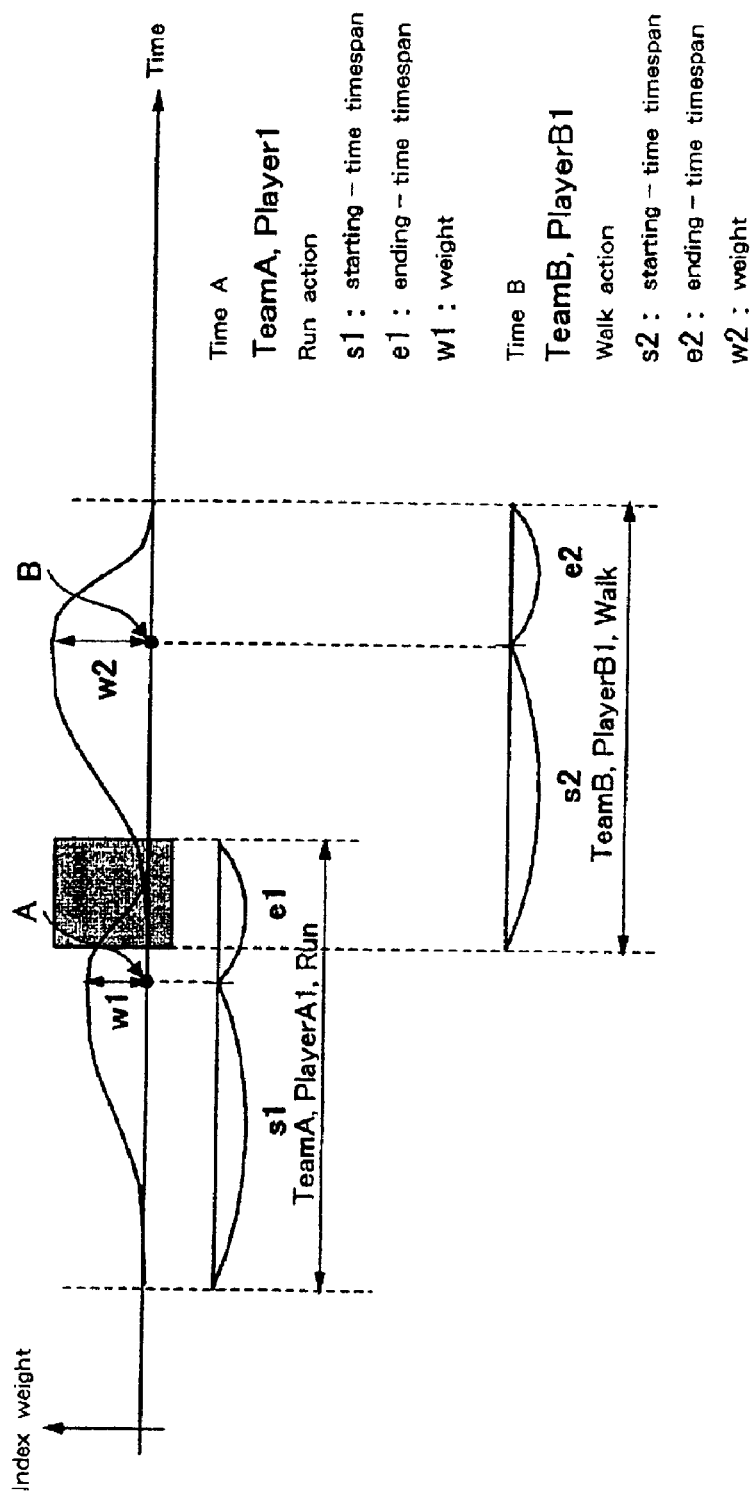
FIG. 16 is a diagram showing an example wherein indexes are overlapped at the same time and at the same interval.

FIG. 16 is a diagram showing an example wherein indexes overlap at the same time and at the same interval. In FIG. 16, time intervals for a Run index for Player A1 of TeamA and a Walk index for PlayerB1 of Team B are overlapped (overlapping portions of e1 and s2).

Figure 17:
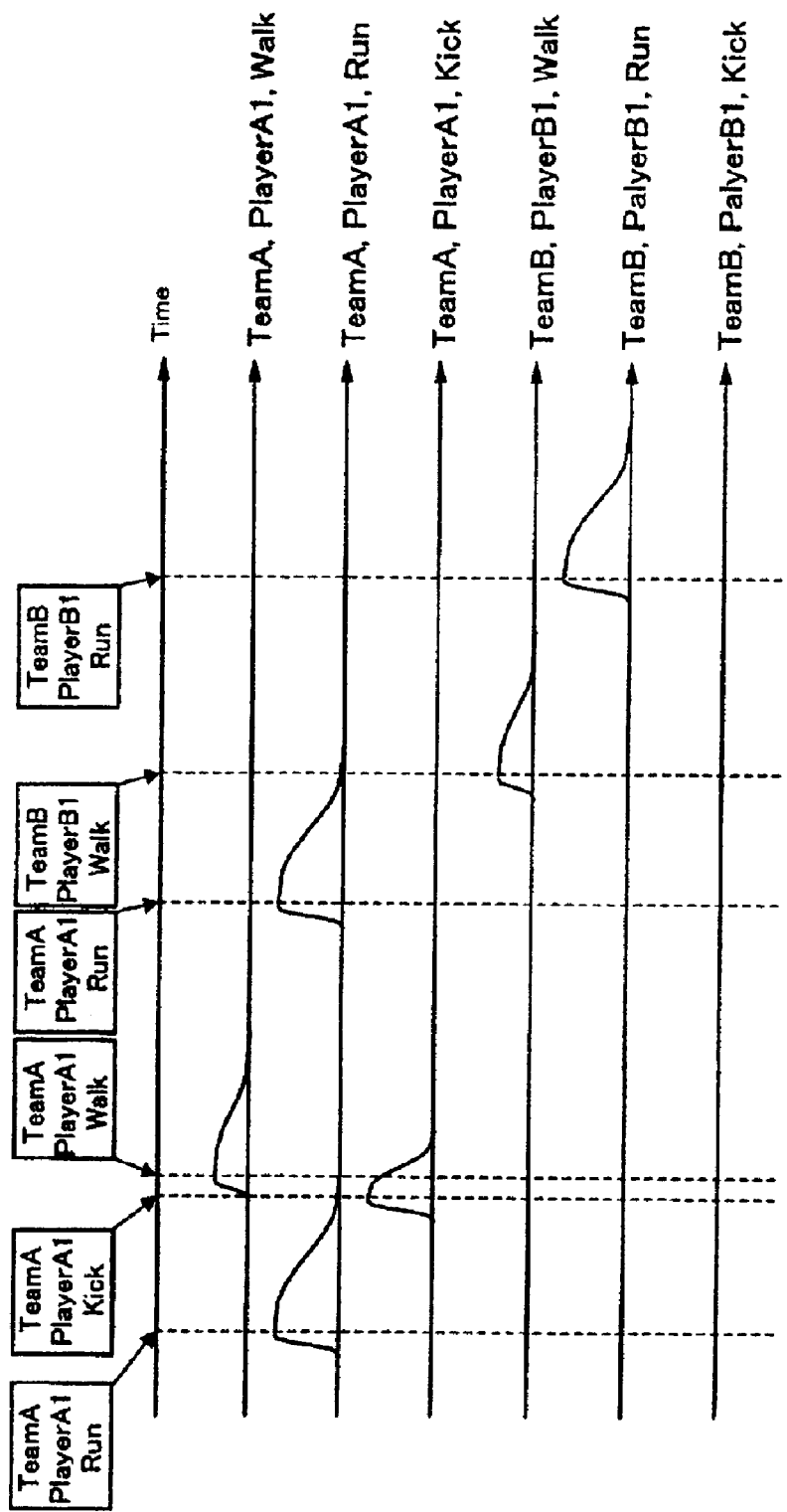
FIG. 17 is a diagram showing an index addition example at a player level.

FIG. 17 is a diagram showing an example wherein an index is added at a player level. When triggering actions as shown in the upper portion in FIG. 17 are input by the index adding person, the index determination device 54 performs an index addition process for each triggering action, and generates and adds the indexes shown in FIG. 17.

EXAMPLE 3

Example for Addition, Deletion and Correction of an Input Index

To add, delete or correct the thus input index, the triggering action correction device 56 is used to perform the following processing.

FIGS. 18A and 18B are flowcharts showing the index addition and deletion processes. Through the processing performed in FIG. 18A, an index can be added to a video. First, the index adding person searches the video displayed on the video display device 55 for a correction for a portion to which an index is to be added (step 201). A check is then performed to determine whether a triggering action has occurred (step 202). When a triggering action has occurred, the triggering action correction device 56 is used to enter the triggering action (step 203), and the processing is thereafter terminated. When at step 202 a triggering action has not occurred, an occurrence of a triggering action is waited for.

Through the processing in FIG. 18B, an index can be deleted from a video. First, the index adding person searches for a target triggering action on the list of triggering actions that were input (step 211). Then, that triggering action is deleted by using the triggering action correction device 56 (step 212).

Figure 19:
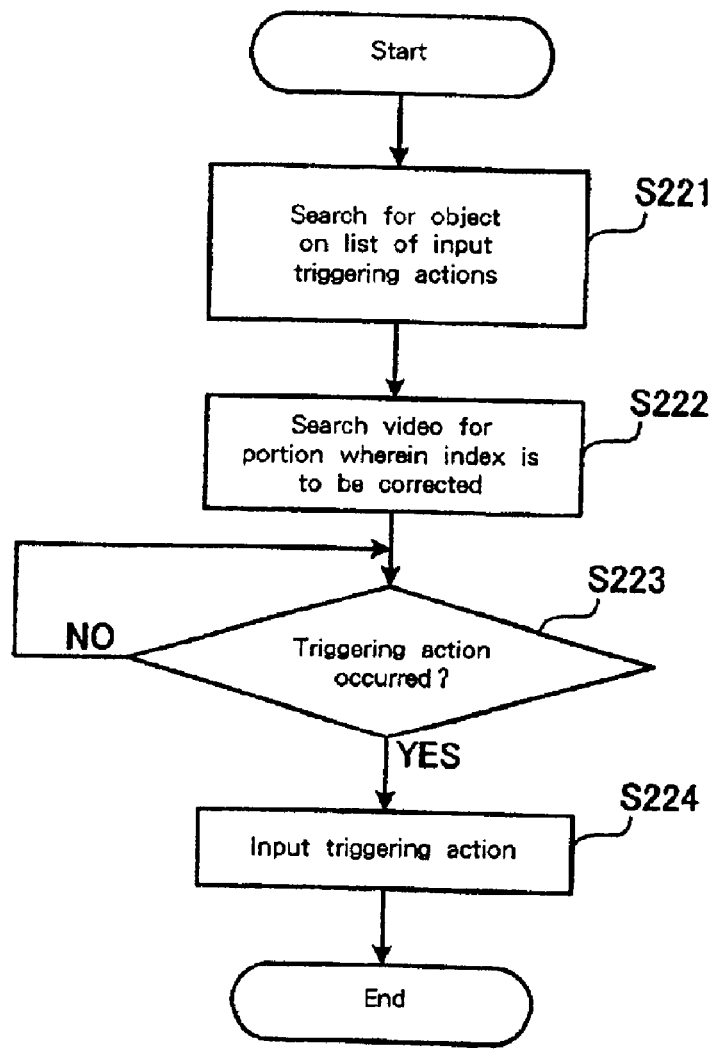
FIG. 19 is a flowchart showing index correction processing.

FIG. 19 is a flowchart showing the index correction processing. The index adding person, who desires to correct an index that has already been added, searches for a target triggering action on the list of the triggering actions that were input (step 221). Then, a portion wherein the index is to be corrected is searched for in the video (step 222), and a check is performed to determine whether a triggering action has occurred (step 223). When a triggering action has not occurred, the occurrence of a triggering action is waited for. But when a triggering action has occurred, the triggering action is input (step 224) and the processing is thereafter terminated.

Figure 20:
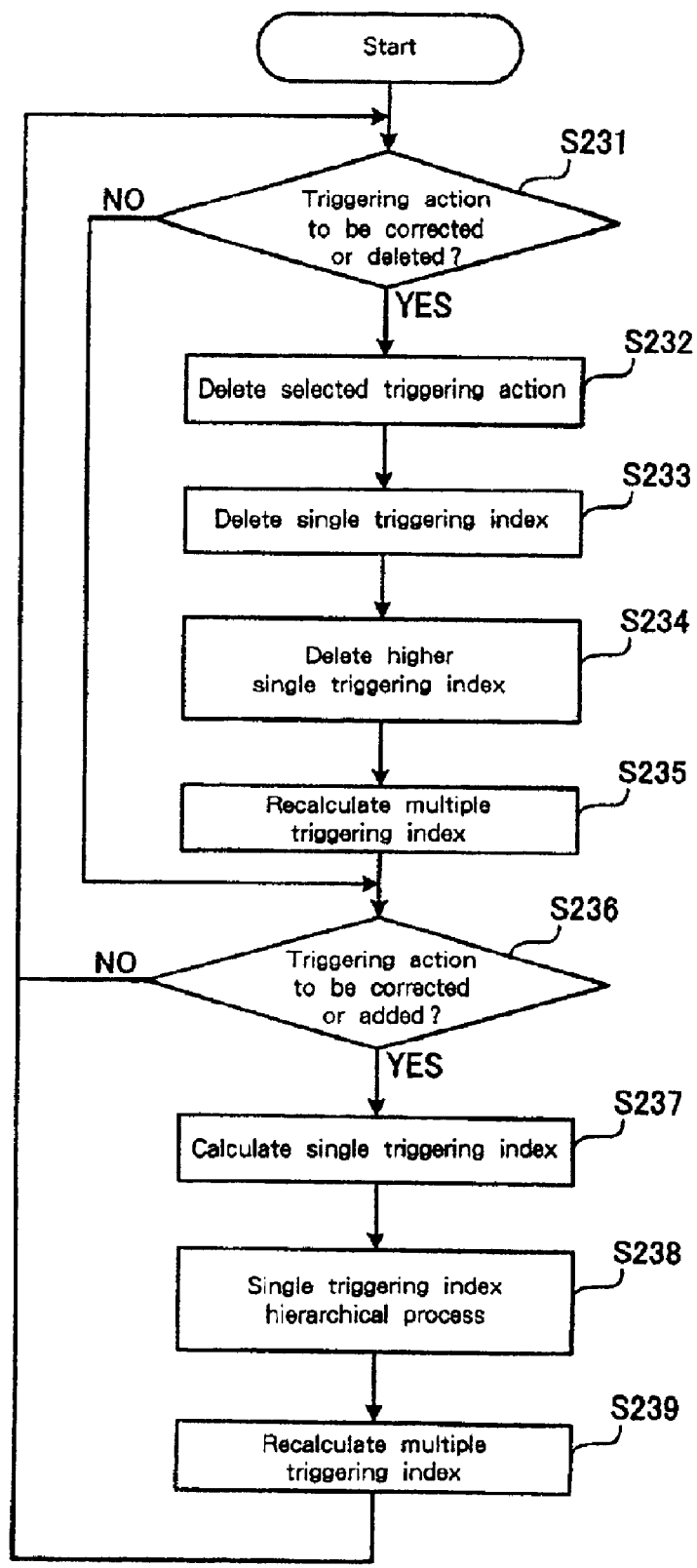
FIG. 20 is a flowchart showing a processing algorithm used by the index determination device for the addition, deletion and correction of an index.

FIG. 20 is a flowchart showing the processing algorithm for the performance by the index determination device 54 of the addition, deletion or correction of an index. First, a check is performed to determine whether a triggering action should be corrected or deleted (step 231). When the correction or deletion of a triggering action should be performed, the selected triggering action is deleted (step 232), the single triggering index is deleted (step 233), and the higher single triggering index is deleted (step 234). Then, the multiple triggering index is re-calculated (step 235), and a check is performed to determine whether a triggering action should be corrected or added (step 236). When the decision is not pertinent to either the correction or addition of a triggering action, program control returns to step 231, and when the decision at step 231 is not pertinent to the correction or deletion of a triggering action, program control is shifted to step 236. When it is determined at step 236 that the correction or addition of triggering action should be performed, the single triggering index calculation (step 237) and the single triggering index hierarchical process (step 238) are performed, and the multiple triggering index is re-calculated (step 239). Thereafter, program control returns to step 231 and the above described process is repeated.

EXAMPLE 4

Index Addition Example for Baseball Video

While the soccer video has been employed for example 1, in this example a baseball video is employed for the explanation.

FIG. 21 is a diagram showing the basic index information 61 for baseball video. In this example, the index description device 51 is employed to define triggering actions that occur in the baseball video and indexes that are identified by these triggering actions, i.e., triggering information 71-3, single triggering index information 72-3, multiple triggering index information 73-3 and additional information 74-3. An index adding person, while viewing a video displayed on the input video display device 52, uses the triggering action input device 53 to select a triggering action type and additional information each time a triggering action occurs, up until the video has ended, in accordance with the input algorithm for a triggering action shown in FIG. 6.

Figure 22:
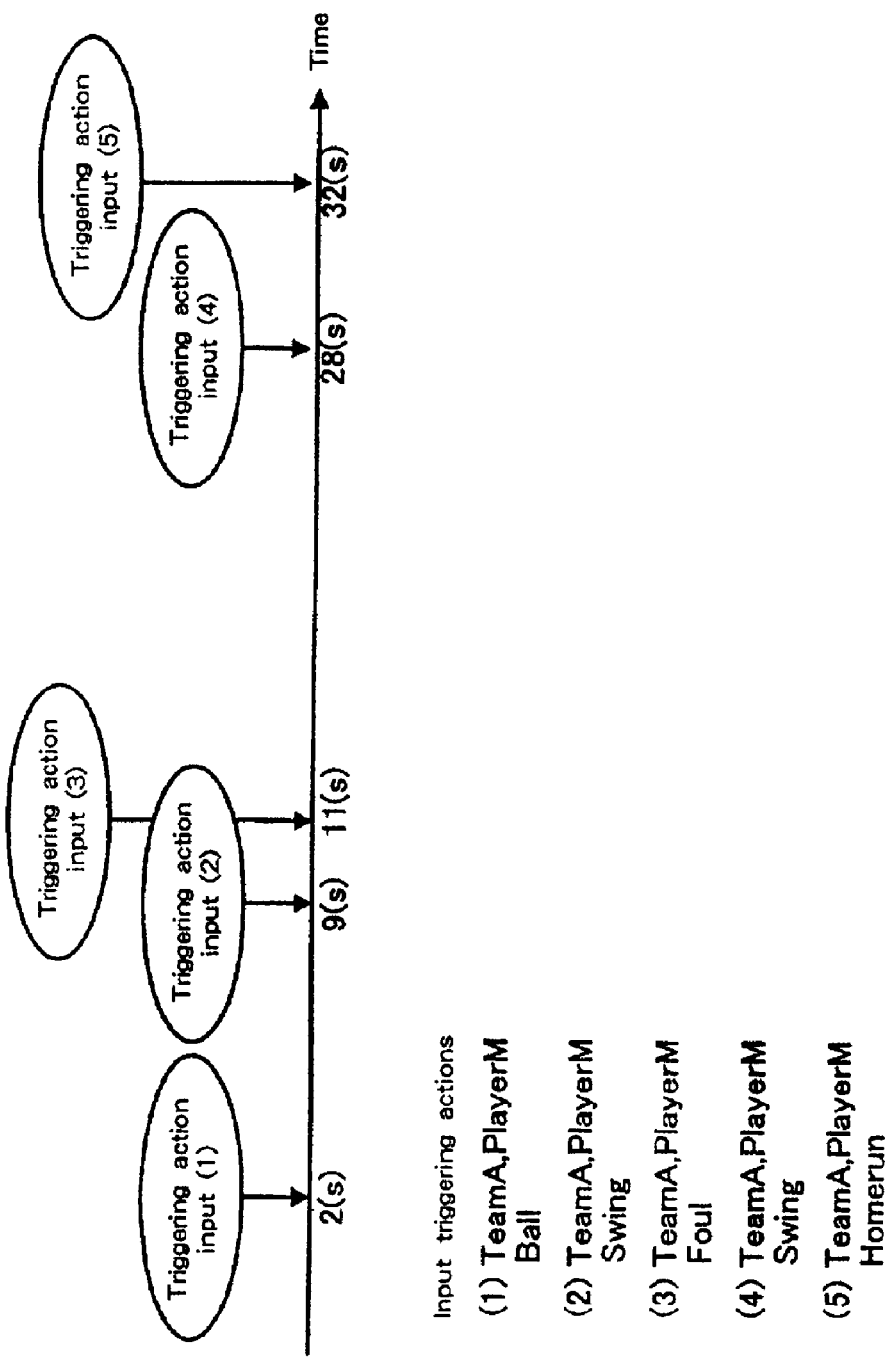
FIG. 22 is a diagram showing triggering action input examples for the baseball video.

FIG. 22 is a diagram showing examples for the input of inputting triggering actions for the baseball video. In FIG. 22, the input examples, triggering action inputs (1) to (5), are shown along a time axis. The processing performed by the index determination device 54 will now be described based on the triggering action input examples in FIG. 22.

First, triggering action input (1) will be described. In this case, at time t=2(s) the index adding person finds a triggering action for a ball (Ball) by a player M (PlayerM) on TeamA (TeamA), and selects TeamA and PlayerM from the additional information list presented by the triggering action input device 53, and selects Ball from the triggering action list. Through this process, the triggering action is input to the device 53, and the index determination device 54 processes the triggering action using the index determination algorithm shown in FIG. 7. In the index determination algorithm, first, the single triggering index calculation at step 112 is performed using a predetermined algorithm, and the effective time range for the Ball index and its index weight are obtained. It should be noted that $\epsilon = \frac{1}{4}^4$.

According to the information for Ball in FIG. 21, w=1, s=2 (s) and e=0.5 (s), and when these values are substituted into the index calculations in FIG. 9C, $$t \leq 2, f(t) = 1 \times \exp\{-(t-2)^2\} \left( \because \sigma_s^2 = \frac{1}{2} \right) \quad \text{[Expression 4]}$$

$$t > 2, f(t) = 1 \times \exp\{-16(t-2)^2\} \left( \because \sigma_e^2 = \frac{1}{32} \right)$$

Since the Ball index is not hierarchically structured for the basic index information 61, an automatic index addition based on a hierarchy is not performed. In addition, since the multiple triggering index wherein the Ball index is related to the index condition is not defined, the multiple triggering index calculation at step 116 in FIG. 7 is also not performed for the basic index information 61.

Triggering action input (2) in FIG. 22 will now be described. In this case, at time t=9(s) the index adding person finds a triggering action for a swing (Swing) by player M (PlayerM) on team A (TeamA), and selects TeamA and PlayerM from the additional information list presented by the triggering action input device 53, and selects Swing from the triggering action list. Thus, the index determination device 54 processes the triggering action using the index determination algorithm shown in FIG. 7.

In the same manner as for the triggering action input (1), first, the effective time range for the Swing index and its index weight are obtained using the single triggering index calculation algorithm in FIGS. 9A to 9C. Since the Swing index is not hierarchically structured in the basic index information 61 in FIG. 21, the automatic index addition based on a hierarchy is not performed. In the basic index information 61, there is a multiple triggering index wherein the Swing index is related to the index condition; however, since a foul (Foul) index and a home run (Homerun) index are not currently present, the index condition is not established and the multiple triggering index calculation is not performed.

Triggering action input (3) in FIG. 22 will now be described. In this case, at time t=11 (s) the index adding person finds a triggering action for a foul (Foul) by player M (PlayerM) on team A (TeamA), selects TeamA from the additional information list presented by the triggering action input device 53, and selects Foul from the triggering action list. Thus, the index determination device 54 processes the triggering action using the index determination algorithm shown in FIG. 7.

In the same manner as for triggering action input (1), first, the effective time range for the Foul index and its index weight are obtained using the single triggering index calculation algorithm in FIGS. 9A to 9C. Then, the processing is performed in accordance with the hierarchical process algorithm in FIG. 10. Since the Foul index is pertinent to a lower index, the Strike index is also automatically added based on a hierarchy. The addition of the Strike index is performed in accordance with the single triggering index addition procedures.

Figure 12:
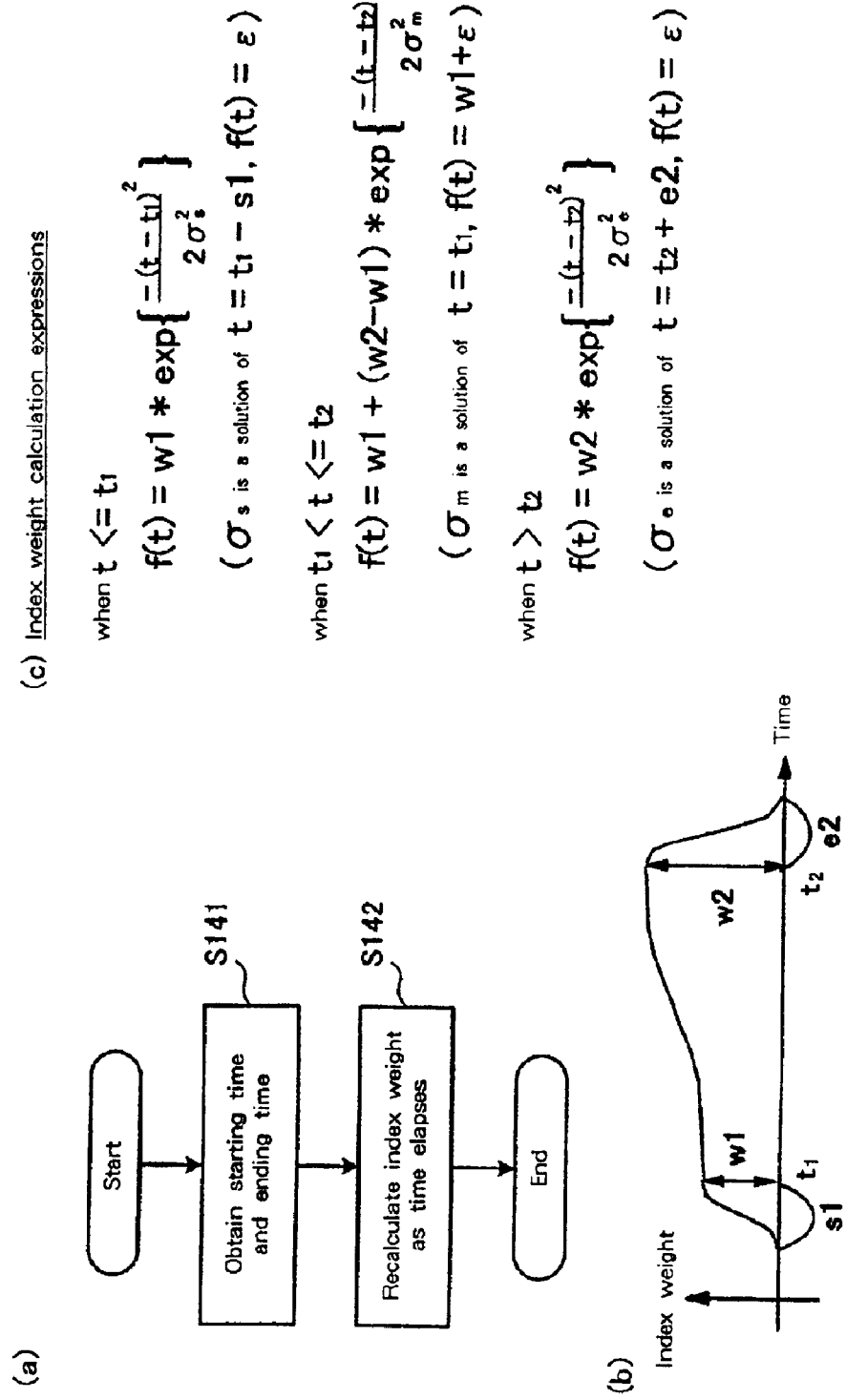
FIGS. 12A to 12C are diagrams for explaining an algorithm for performing a multiple triggering index calculation in FIG. 7.

Since there is a multiple triggering index wherein the Foul index is related to the index condition and the index condition Swing→Foul is satisfied, the index weight is calculated using the multiple triggering calculation algorithm in FIG. 12. It should be noted that $\epsilon=1/e^4$. In FIG. 21, the Swing index is w1=1 and s1=2(s), and the Foul index is w2=2 and e2=1(s). When these values are substituted into the index weight calculations in FIG. 12, the following expressions are obtained.

$$t \le 9, f(t) = 1 \times \exp\{-(t-9)^2\}\left(\because \sigma_s^2 = \frac{1}{2}\right) \quad \text{[Expression 5]}$$

$$9 < t \le 11, f(t) = 1 \times \exp\{-(t-11)^2\}\left(\because \sigma_m^2 = \frac{1}{2}\right)$$

$$t > 11, f(t) =$$

$$2 \times \exp\{-2(4+\log_e 2)(t-11)^2\}\left(\because \sigma_e^2 = \frac{1}{2(4+\log_e 2)}\right)$$

Triggering action input (4) in FIG. 22 will now be described. In this case, at time t=28 (s) the index adding person finds a triggering action for a swing (Swing) by player M (PlayerM) on team A (TeamA), selects TeamA and PlayerM from the additional information list presented by the triggering action input device 53, and selects Swing from the triggering action list. Thus, the index determination device 54 processes the triggering action using the index determination algorithm shown in FIG. 7. In the same manner as for triggering action input (1), first, the effective time range for the Swing index and its index weight are obtained using the single triggering index calculation algorithm in FIGS. 9A to 9C. And in the same manner as for triggering action input (2), the index hierarchical process and the multiple triggering index calculation process are not performed.

Triggering action input (5) in FIG. 22 will now be described. In this case, at time t=32 (s) the index adding person finds a triggering action for a homerun (Homerun) by player M (PlayerM) on team A (TeamA), selects TeamA and PlayerM from the additional information list presented by the triggering action input device 53, and selects Homerun from the triggering action list. Thus, the index determination device 54 processes the triggering action using the index determination algorithm shown in FIG. 7. In the same manner as for triggering action input (1), first, the effective time range for the Homerun index and its index weight are obtained using the single triggering index calculation algorithm in FIGS. 9A to 9C. Then, the processing is performed in accordance with the hierarchical process algorithm in FIG. 10, and the Hit index, which is ranked higher than the Homerun index, is also automatically added.

Finally, in triggering action input (5), since there is a multiple triggering index wherein the Homerun index is related to the index condition and the index condition Swing → Homerun is satisfied, the index weight is calculated using the multiple triggering action calculation algorithm in FIG. 12. It should be noted that $\epsilon=1/e^4$. In FIG. 21, the Swing index is w1=1 and s1=2(s), and the Homerun index is w2=4 and e2=2(s). When these values are substituted into the index weight calculations in FIG. 12, the following expressions are obtained (see FIG. 13).

$$t \le 28, f(t) = 1 \times \exp\{-(t-28)^2\}\left(\because \sigma_s^2 = \frac{1}{2}\right) \quad \text{[Expression 6]}$$

$$28 < t \le 32, f(t) = 3 \times \exp\left\{\frac{-(4+\log_e 3)(t-32)^2}{16}\right\} + 1\left(\because \sigma_m^2 = \frac{8}{4+\log_e 3}\right)$$

$$t > 32, f(t) = 4 \times \exp\left\{\frac{-(2+\log_e 2)(t-32)^2}{8}\right\}\left(\because \sigma_e^2 = \frac{4}{2+\log_e 2}\right)$$

Figure 23:
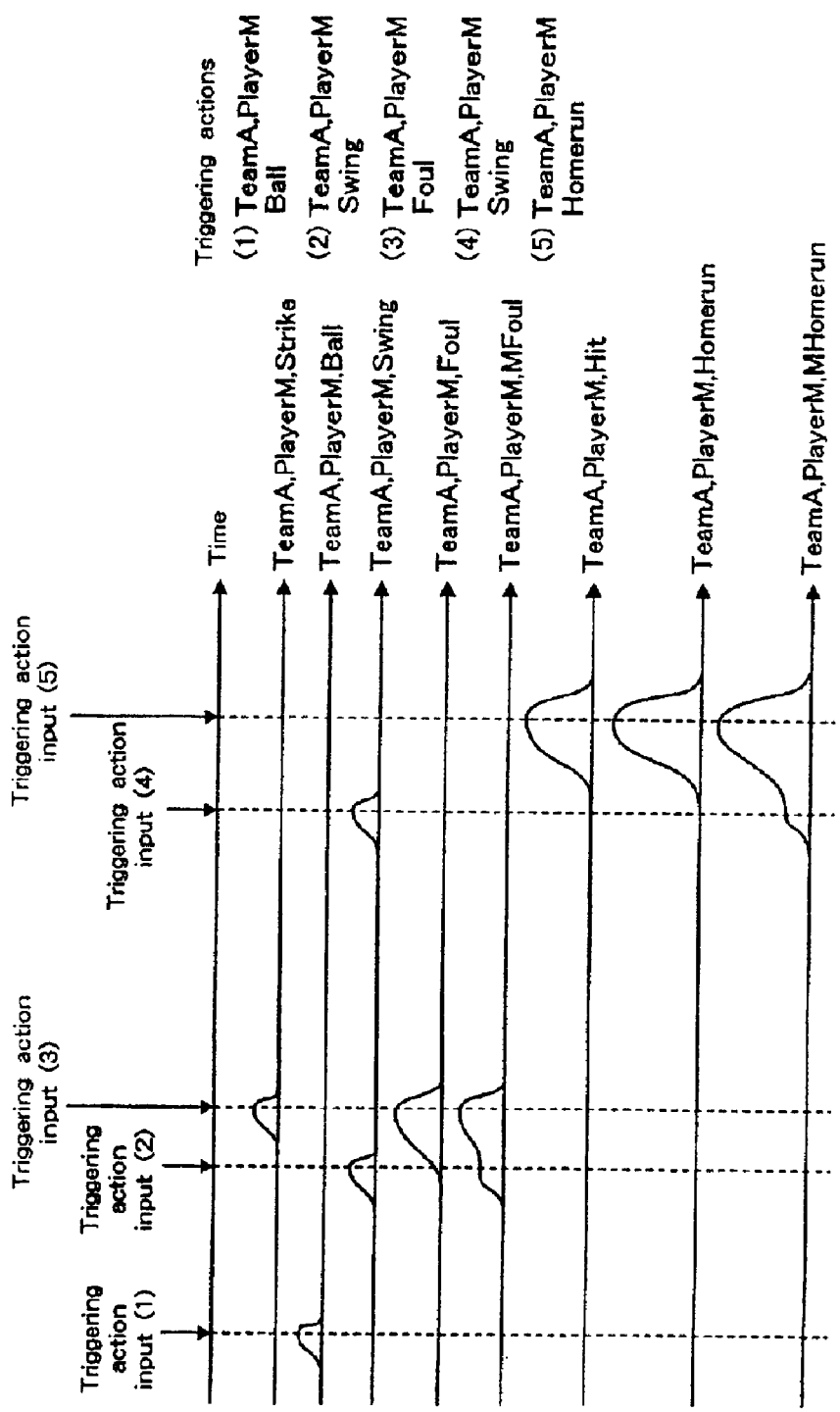
FIG. 23 is a diagram showing example 4, i.e., an index addition example for the baseball video.

FIG. 23 is a diagram showing the example 4, i.e., the index addition example for the baseball video. In FIG. 23, through the above processing sequence, indexes that are added in triggering action inputs (1) to (5) in FIG. 22 are shown. For example, it can be understood that a multiple triggering index is generated in triggering action inputs (2) and (3) and also in triggering action inputs (4) and (5).

As is described above in detail, the index addition unit 21 in this embodiment employs the basic index information 61, which is defined in advance, and the triggering action history that is entered by the index adding person to calculate the effective time range for an index and its index weight and to add them to the video. Thus, different indexes that are independent of each other can be added at the same interval, and more detailed meanings can be provided for the video. In addition, when the index addition unit 21 in this embodiment is employed, the contents provider 20 need only enter a triggering action while actually watching the video, so that the contents provider 20 can quickly add an index, with which a short digest reflecting the interests and tastes of the client 10, who is an index user, can be generated for a video for which immediacy is required.

Furthermore, when the index addition unit 21 of this embodiment is employed only one index adding person is required to enter indexes for each team in, for example, a soccer video or a baseball video. However, since it is extremely difficult for detailed indexes for each player to be added by one person, either a representative player for which an index is to be added should be determined in advance, or a plurality of index adding persons should be employed to add indexes at the same time.

Advantage of the Invention

As is described above, according to the invention, it is possible to add, in real time, indexes that can be used to generate shorter digests that match the interests and the tastes of users.

What is claimed is:

1. An index generation method comprising the steps of: defining, in advance, basic index information concerning an index that constitutes data that describes contents including a set of triggering actions; and generating said index by employing operating procedures that use said basic index information, wherein information relative to a triggering action for the generation of an index and information concerning a timespan for said index are defined for said basic index information wherein said basic index information defines information concerning a hierarchy of at least one higher triggering action related to a lower triggering action such that said lower triggering action comes within said higher triggering action for a single triggering index that is formed for a single lower triggering action, and wherein a higher index covering said higher triggering action is added when the lower index covering said lower triggering action is added.

2. An index generation method comprising the steps of: defining, in advance, basic index information concerning an index that constitutes data that describes contents; and generating said index by employing operating procedures that use said basic index information, wherein information relative to a triggering action for the generation of an index and information concerning a timespan for said index are defined for said basic index information wherein said basic index information defines information concerning a composite index that is formed by the effects produced by at least two triggering actions acting together.

3. An index generation method that uses at least one triggering action to trigger the index generation of an index which is data concerning contents, comprising the steps of: selecting at least one triggering action from among a set of multiple triggering actions that are defined in advance; determining an index effective time range for said selected triggering action, based on a first timespan extending from the occurrence of a triggering action to an index start and a second timespan extending from the occurrence of a triggering action to an index end, said timespans being defined in advance; generating an index corresponding to said triggering action based on said effective time range; and calculating a weight value from an algebraic formula containing said first timespan, said second timespan and a weight constant.

4. The index generation method according to claim 3, wherein at least two triggering actions act together with a first timespan extending from the occurrence of a first triggering action to said index start, and a second timespan extending from the occurrence of a second triggering action to said index end and for an intermediate period between said first triggering action and said second triggering action, a different constant is defined in advance for each triggering action, and said effective time range is determined based on said defined values of said first timespan, second timespan and intermediate period.

5. A method according to claim 1, further comprising a step of determining an index effective time range for said lower triggering action, based on a first timespan extending from the occurrence of said lower triggering action to an index start and a second timespan extending from the occurrence of said lower triggering action to an index end, said timespans being defined in advance; and generating an index corresponding to said triggering action based on said effective time range; and calculating a weight value from an algebraic formula containing said first timespan, said second timespan and a weight constant.

6. A method according to claim 5, in which said algebraic formula contains a declining exponential containing said first timespan, said exponential being multiplied by said weight constant.

7. A method according to claim 2, further comprising a step of determining an index effective time range for said at least two triggering actions, based on a first timespan extending from the occurrence of a first of said triggering actions to an index start and a second timespan extending from the occurrence of a second triggering action to an index end, said timespans being defined in advance; and generating an index corresponding to said triggering action based on said effective time range; and calculating a weight value from an algebraic formula containing said first timespan, said second timespan and a weight constant.

8. The index generation method according to claim 7, wherein at least two triggering actions act together with a first timespan extending from the occurrence of a first triggering action to said index start, and a second timespan extending from the occurrence of a second triggering action to said index end and for an intermediate period between said first triggering action and said second triggering action, a different constant is defined in advance for each triggering action, and said effective time range is determined based on said defined values of said first timespan, second timespan and interval period.

9. An article of manufacture in computer readable form comprising means for performing a method for operating a computer system having a program, said method comprising the steps of claim 1.

10. An article of manufacture in computer readable form comprising means for performing a method for operating a computer system having a program, said method comprising the steps of claim 5.

11. An article of manufacture in computer readable form comprising means for performing a method for operating a computer system having a program, said method comprising the steps of claim 2.

12. An article of manufacture in computer readable form comprising means for performing a method for operating a computer system having a program, said method comprising the steps of claim 7.

13. An article of manufacture in computer readable form comprising means for performing a method for operating a computer system having a program, said method comprising the steps of claim 3.

14. An article of manufacture in computer readable form comprising means for performing a method for operating a computer system having a program, said method comprising the steps of claim 4.

15. An article of manufacture in computer readable form comprising means for performing a method for operating a computer system having a program, said method comprising the steps of claim 8.

16. The index generation method according to claim 1, wherein said information concerning said timespan, which is defined as said basic index information, is a timespan extending from the occurrence of a triggering action to an index start, and a timespan extending from the occurrence of a triggering action to an index end.

17. The index generation method according to claim 1, wherein the weight of said index is defined for said basic index information.

18. The index generation method according to claim 1, wherein at least two triggering actions act together with a first timespan extending from the occurrence of a first triggering action to said index start, and a second timespan extending from the occurrence of a second triggering action to said index end and for an intermediate period between said first triggering action and said second triggering action, a different constant is defined in advance for each triggering action, and said effective time range is determined based on said defined values of said first timespan, second timespan and intermediate period.

19. The index generation method according to claim 2, wherein said information concerning said timespan, which is defined as said basic index information, is a timespan extending from the occurrence of a triggering action to an index start, and a timespan extending from the occurrence of a triggering action to an index end.

20. The index generation method according to claim 2, wherein the weight of said index is defined for said basic index information.

21. The index generation method according to claim 2, wherein at least two triggering actions act together with a first timespan extending from the occurrence of a first triggering action to said index start, and a second timespan extending from the occurrence of a second triggering action to said index end and for an intermediate period between said first triggering action and said second triggering action, a different constant is defined in advance for each triggering action, and said effective time range is determined based on said defined values of said first timespan, second timespan and intermediate period.

\* \* \* \* \*